(12) United States Patent
Pedersen

(10) Patent No.: US 8,520,004 B2
(45) Date of Patent: Aug. 27, 2013

(54) INTERACTIVE LABYRINTH CURVE GENERATION AND APPLICATIONS THEREOF

(75) Inventor: Hans Kohling Pedersen, Las Vegas, NV (US)

(73) Assignee: Daedal Doodle, LLC, Las Vegas, NV (US)

( * ) Notice: Subject to any disclaimer, the term of this patent is extended or adjusted under 35 U.S.C. 154(b) by 387 days.

(21) Appl. No.: 13/088,351

(22) Filed: Apr. 16, 2011

(65) Prior Publication Data

US 2011/0187720 A1 Aug. 4, 2011

Related U.S. Application Data

(63) Continuation-in-part of application No. 11/810,391, filed on Jun. 4, 2007, now Pat. No. 7,928,983.

(51) Int. Cl.
*G06T 11/20* (2006.01)
(52) U.S. Cl.
USPC .......................................................... 345/442
(58) Field of Classification Search
USPC .......................................................... 345/442
See application file for complete search history.

(56) References Cited

U.S. PATENT DOCUMENTS

| | | | | | |
|---|---|---|---|---|---|
| 4,785,399 | A | * | 11/1988 | Evans et al. | 715/810 |
| 5,602,943 | A | * | 2/1997 | Velho et al. | 382/266 |
| 5,831,633 | A | * | 11/1998 | Van Roy | 345/441 |
| 6,256,039 | B1 | * | 7/2001 | Krishnamurthy | 345/420 |
| 6,268,871 | B1 | * | 7/2001 | Rice et al. | 345/442 |
| 6,347,995 | B1 | * | 2/2002 | Igarashi et al. | 463/15 |
| 6,804,573 | B2 | * | 10/2004 | Goldman | 700/138 |
| 6,968,255 | B1 | * | 11/2005 | Dimaridis et al. | 700/131 |
| 2002/0135578 | A1 | * | 9/2002 | Wenzel et al. | 345/442 |
| 2005/0237325 | A1 | * | 10/2005 | Motter et al. | 345/442 |
| 2007/0188489 | A1 | * | 8/2007 | Lalvani | 345/420 |
| 2009/0027396 | A1 | * | 1/2009 | Frisken | 345/442 |

* cited by examiner

*Primary Examiner* — Carlos Perromat
(74) *Attorney, Agent, or Firm* — Lumen Patent Firm

(57) ABSTRACT

Complex labyrinth curves are interactively generated by an iterative process that spatially modulates curve evolution by an image or other function defined on the evolution space. After curves and evolution parameters are initialized [100], the iterative process resamples the curves [104], and spatially modulates the curves according to the evolution parameters [106]. The spatial modulation includes computing sample point displacements by calculating distances between each of the sample points and neighboring points using a surface distance metric that estimates a geodesic distance metric in a two-dimensional non-Euclidean evolution space. The evolved labyrinth curves are may be processed [110] for use in various applications. The evolved curves can also be triangulated and projected to a plane to create patterns for manufacturing developable surfaces.

8 Claims, 40 Drawing Sheets

*Fig. 13A* 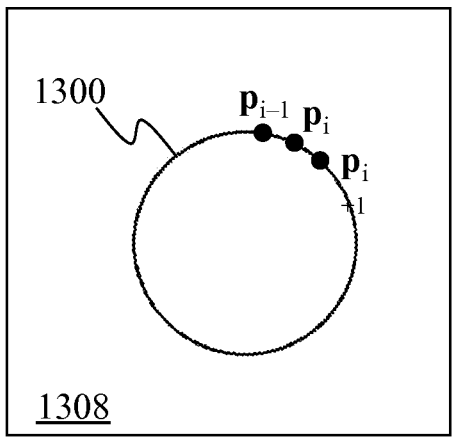 *Fig. 13B* 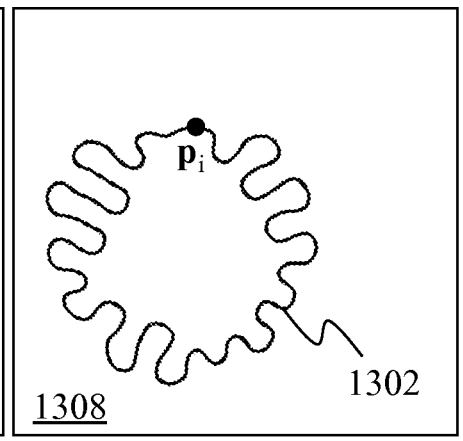
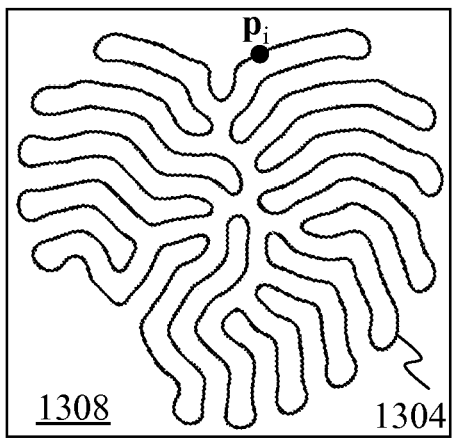 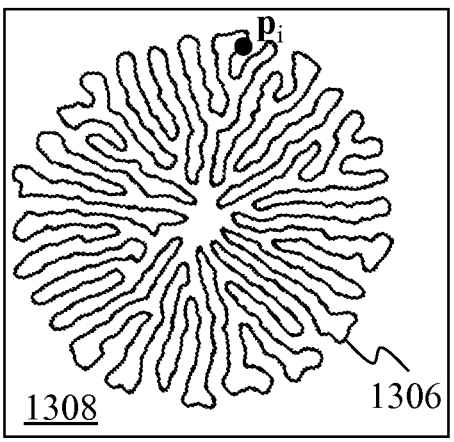
*Fig. 13C* *Fig. 13D*

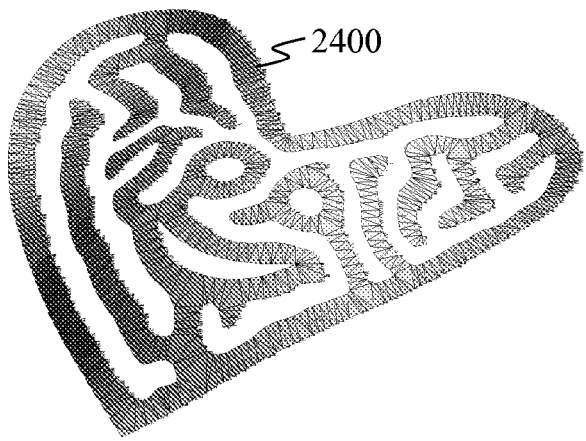
*Fig. 24A*
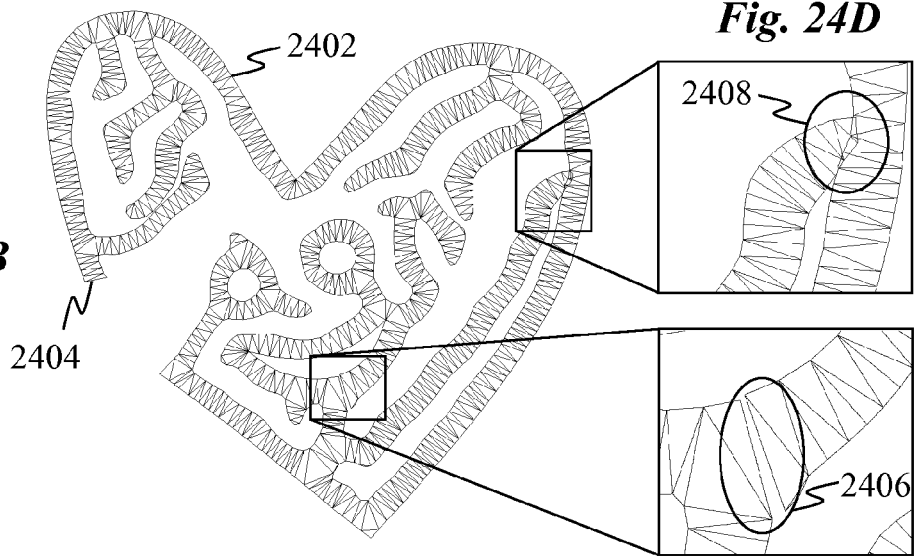
*Fig. 24B*
*Fig. 24D*
*Fig. 24C*
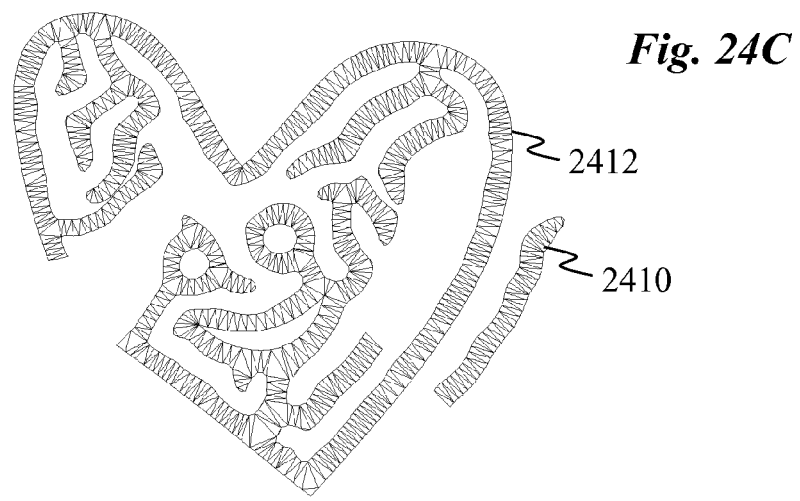
*Fig. 24E*

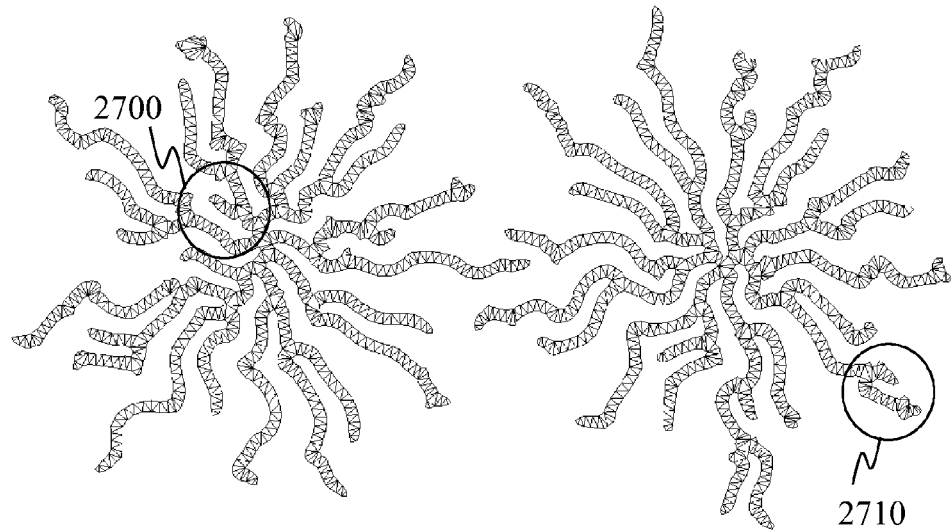
*Fig. 27A*  *Fig. 27B*
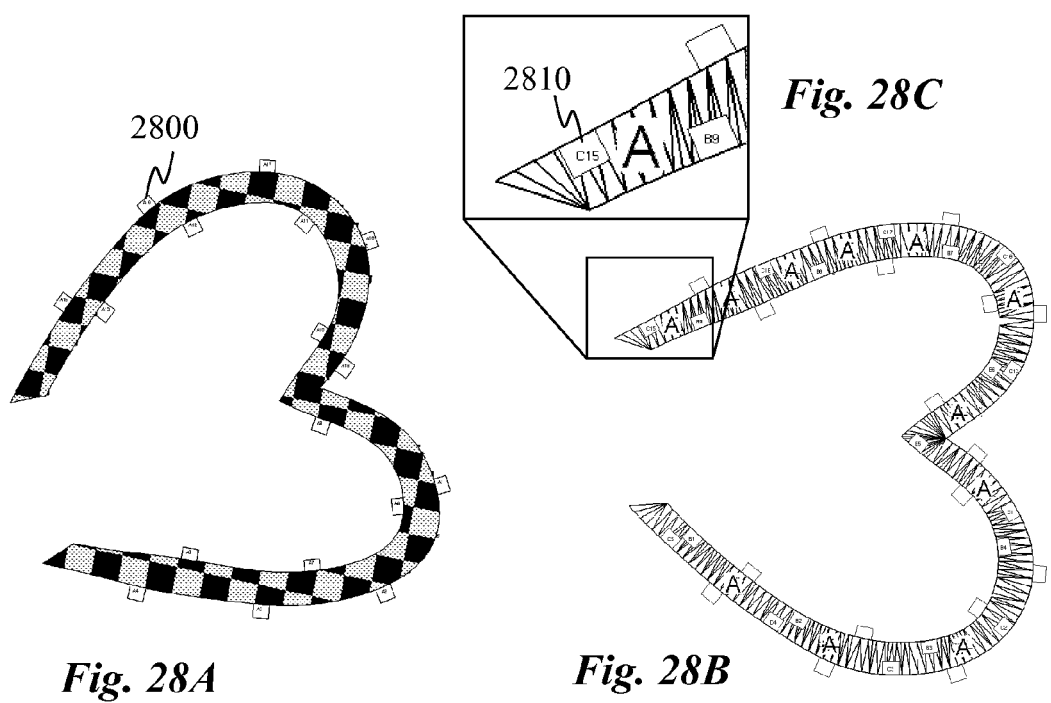
*Fig. 28A*  *Fig. 28B*  *Fig. 28C*

*Fig. 32A*
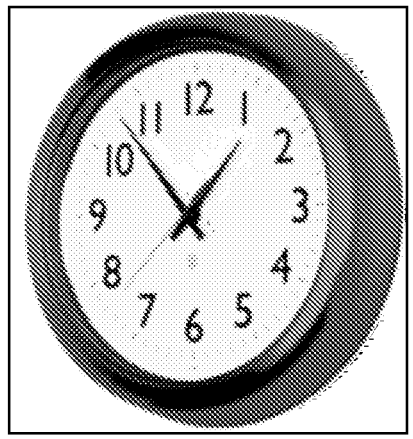
*Fig. 32B*
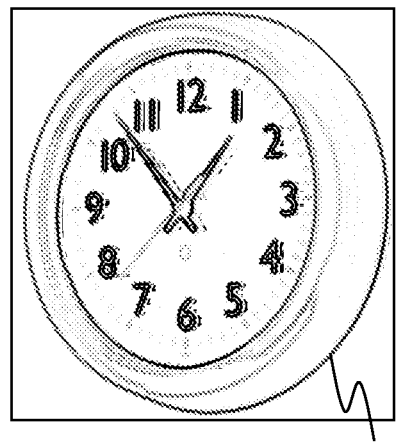
3200
3202
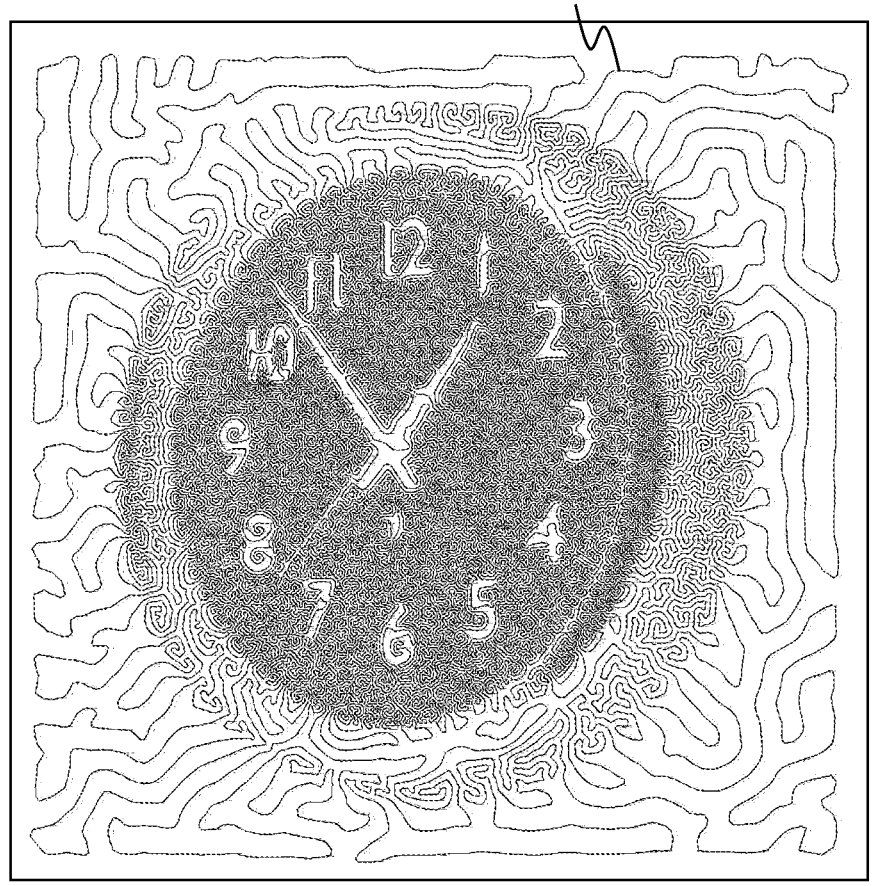
*Fig. 32C*

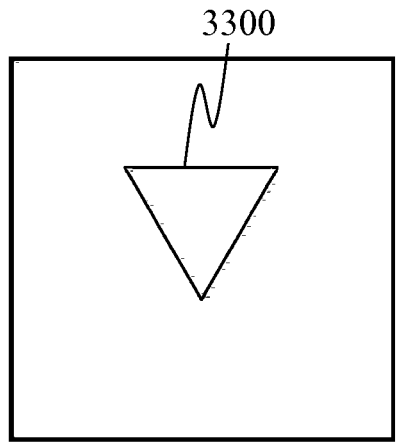
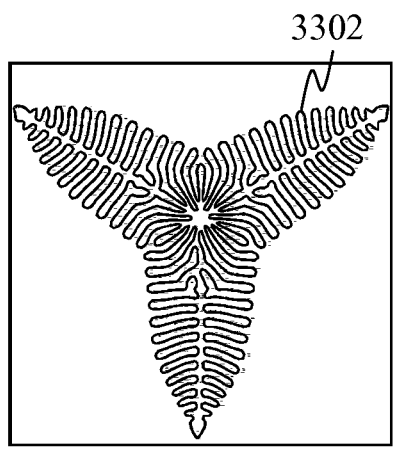
*Fig. 33A*  *Fig. 33B*
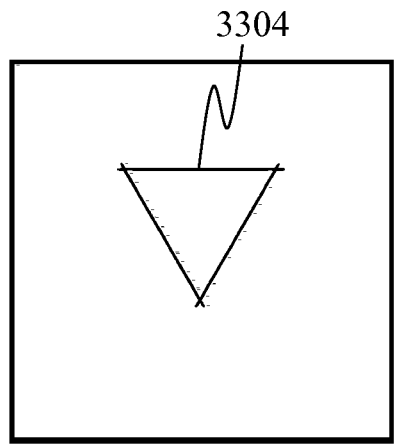
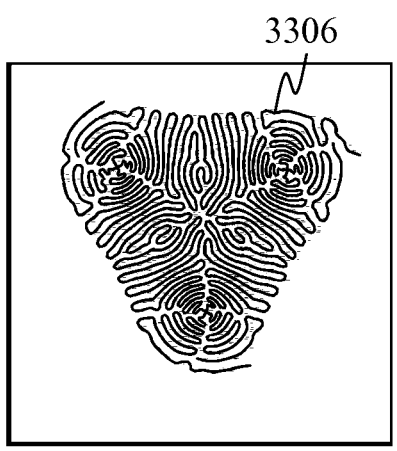
*Fig. 33C*  *Fig. 33D*

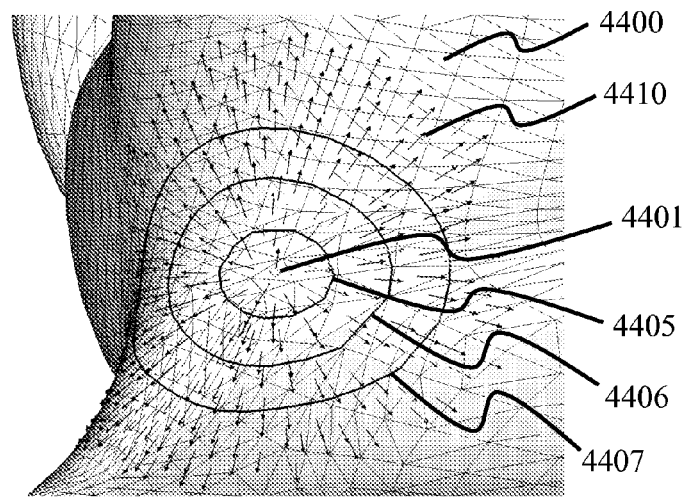
*Fig. 44*
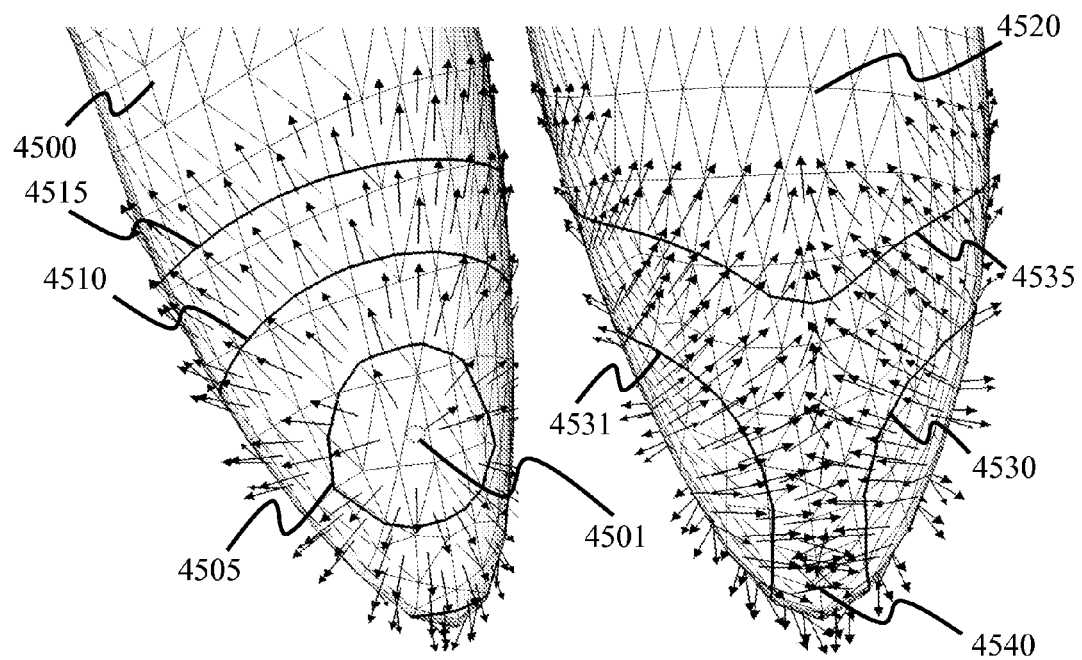
*Fig. 45A*     *Fig. 45B*

US 8,520,004 B2

INTERACTIVE LABYRINTH CURVE GENERATION AND APPLICATIONS THEREOF

CROSS-REFERENCE TO RELATED APPLICATIONS

This application is a continuation-in-part of U.S. patent application Ser. No. 11/810,391 filed Jun. 4, 2007, issued Apr. 19, 2011 as U.S. Pat. No. 7,928,983, which is incorporated herein by reference.

FIELD OF THE INVENTION

The present invention relates generally to computer graphics and computer assisted design techniques. More specifically, it relates to interactive computer-implemented methods for generating maze and labyrinth patterns.

BACKGROUND OF THE INVENTION

For centuries, maze and labyrinth patterns have been manually created as artistic designs, religious symbols, and intellectual puzzles. Due to their high geometric complexity, large and intricate maze and labyrinth patterns are time consuming to produce manually. Accordingly, various computer implemented methods have been developed to assist in the creation of such patterns.

U.S. Pat. No. 6,347,995 describes the construction of a maze on a discrete rectangular grid. Two grid blocks are marked start and end by a user. The system then generates a random trunk path connecting start and end blocks. U.S. Pat. No. 4,718,017 presents similar techniques for generating mazes on a 2D grid of cells. The mazes are formed by marking each cell in the grid as either a wall or a path (black or white). Thus, the paths are restricted to follow the cells of a grid. When projected to the surface of a 3D object, however, the grid often must be stretched, sometimes severely distorting the pattern.

U.S. Pat. No. 5,831,633 describes a technique for generation of complex fractal imagery. In a "drawing process" the user specifies a "template", i.e. a series of curve segments. Individual segments are then replaced with a transformed copy of the template in a recursive process that is a generalization of Mandelbrot's original algorithm. The end result is the "shape" of a fractal. In a "colorization" process the user controls the coloring of the fractal with the help of a "color path" that is specified as part of the template. Though the coloring process is independent of the drawing process, they both use the same iterative process. The technique does not produce mazes or labyrinths.

U.S. Pat. No. 6,968,255 describes a fractal technique for generating decorative curve patterns for applications related to embroidery. The inputs to the algorithm are a closed 2D boundary curve and a fractal shape (i.e., a pathway/curve with associated rules for fractal generation). The algorithm then iteratively applies the fractal axioms to the pathway. The resulting fractal curve is then smoothed and clipped to the boundary curve. Fractal techniques such as this one start out with a template and iteratively replace parts of the template with transformed copies of the template in a deterministic process.

U.S. Pat. No. 6,804,573 deals with the automatic creation of embroidery information from an image. The image is first segmented into closed regions (called objects) based on color posterization. Thin objects are those which can be approximated by a constant offset thickness around skeletal curves. The skeletal curves or medial axis of the thin object is thus computed and a constant thickness stitch defined along it. Thick objects are fragmented into sub-regions that are monotonic with respect to a given stitch angle (so that they can be stitched in runs). A stitch ordering over the parts is also defined to minimize thread cuts as the needle moves from part to part. The technique involves no evolution of a pattern toward increasing geometric complexity, and does not produce a maze or labyrinth.

U.S. Pat. No. 5,602,943 discloses a method to produce a monochrome image from a grayscale or color image by first defining a traversal pattern based on a space-filling curve. Each point on the curve corresponds to a cluster of pixels of the image. The cluster is evaluated for intensity and used to generate an equivalent set monochromatic pixels. The space filling curves are picked from a standard set Hilbert, Peano or Sierpinski curves at a fixed level of subdivision globally determined by the image. The curves do not evolve.

SUMMARY OF THE INVENTION

In contrast with prior techniques, the present invention provides methods for generating labyrinth curves by an evolution process guided by user interaction and spatially modulating evolution parameters that influence the curve evolution in different ways at different locations. In an iterative process, the curve evolution is controlled in part by evolution parameters that spatially modulate the curve by an image, surface texture map, or other function defined on the evolution space.

In one aspect, the invention provides a computer-implemented method for generating a labyrinth. The method includes initializing by a computer curve evolution parameters and a curve network, where the curve network includes a curve embedded in a two-dimensional non-Euclidean evolution space, and where the curve includes a linearly ordered set of sample points in the evolution space. The curve evolution parameters include real-valued functions defined on the evolution space. The method also includes evolving by the computer the curve using an iterative process, where the curve evolves in accordance with the curve evolution parameters during the iterative process to produce an evolved curve having an increased geometric complexity. The computer renders the evolved curve and displays it on a display.

Each iteration of the iterative process includes i) resampling the curve to increase the uniformity of spacing between adjacent point samples of the curve; and ii) spatially modulating the sample points of the curve by the curve evolution parameters, where the spatial modulation includes computing, for each of the sample points, a displacement calculated in part by evaluating at each of the sample points a function defined on the evolution space. The computation of the displacement includes calculating distances between each of the sample points and neighboring points using a surface distance metric that estimates a geodesic distance metric in the two-dimensional non-Euclidean evolution space.

Some embodiments include precomputing the distances between each of the sample points and the neighboring points using the surface distance metric, and storing the precomputed distances in a lookup table. Calculating the distances using the surface distance metric may be performed by looking up the precomputed distances stored in the lookup table. The method may also include calculating gradient vectors to the distances using the surface distance metric by looking up precomputed gradient values stored in the lookup table.

Computing the displacement may include calculating distances between line segments of the curve and neighboring points using the surface distance metric. The method may include precomputing the distances between line segments of the curve and neighboring points using the surface distance metric, and storing the precomputed distances in a lookup table. Calculating the distances between line segments of the curve and neighboring points using the surface distance metric may be performed by looking up the precomputed distances stored in the lookup table. The method may also include calculating a geodesic curve between two points using the surface distance metric by looking up the precomputed distances and looking up precomputed gradient values at the two points, and progressing along the precomputed gradient vector field from both directions.

BRIEF DESCRIPTION OF THE DRAWINGS

FIGS. 13A-D are diagrams illustrating four stages in the evolution of a curve, according to an embodiment of the present invention.

FIGS. 24A-E are diagrams illustrating the method for developing a three dimensional triangle strip onto the plane.

FIGS. 27A-B are diagrams illustrating two dimensional triangle strips developed from a sphere.

FIGS. 28A-C are diagrams that illustrate how tabs and guides printed on the interior side of triangle strips can be used for easier assembly of physical articles.

FIGS. 32A-C are diagrams illustrating the use of automated feature detection for automated generation of boundary curves.

FIGS. 33A-D are diagrams illustrating how slight variations in input curves can lead to very different results of the curve evolution.

FIG. 40A shows the gradient field to the Euclidean distance function relative to a point on a surface. FIG. 40B. shows the gradient field to the geodesic distance function relative to a point on a surface.

FIG. 44 shows a part of a mesh along with iso-contours and gradient vectors corresponding to the surface distance to a point on a triangle.

FIG. 45A-B show two views of iso-contours and gradient vectors corresponding to surface distance to a point on a triangle.

DETAILED DESCRIPTION

Figure 1:
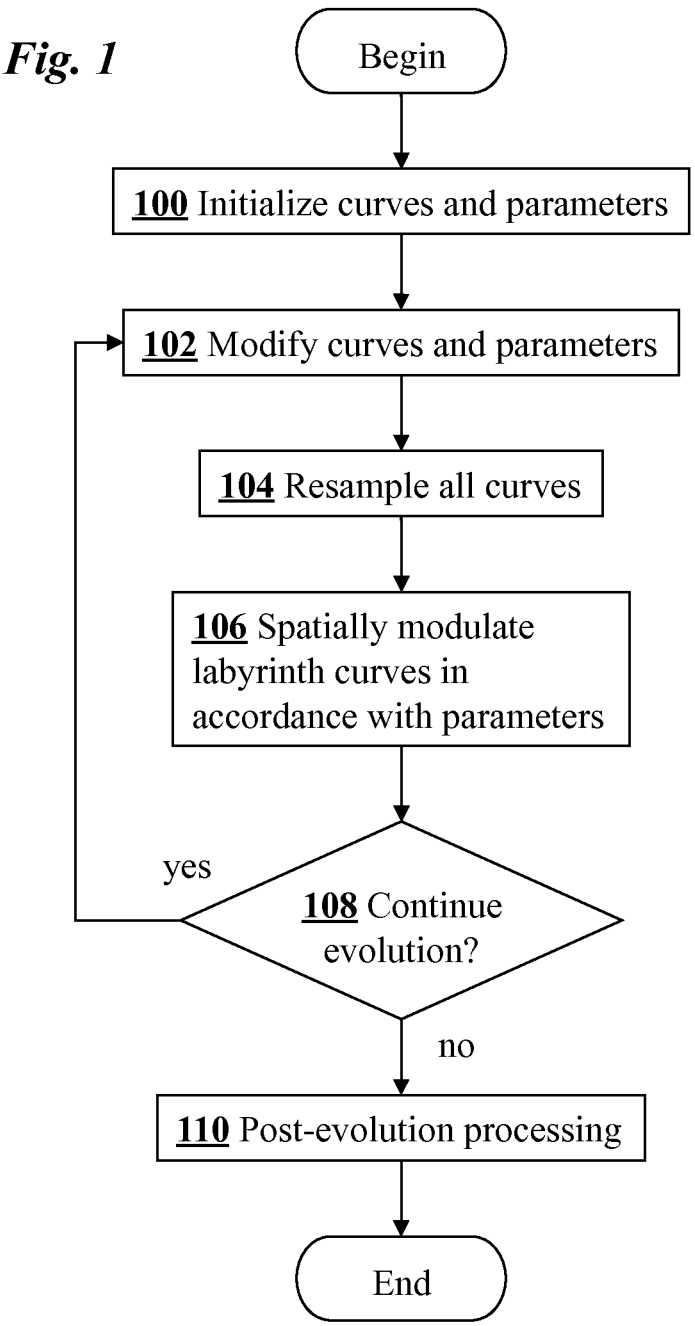
FIG. 1 is a flow chart illustrating main steps of a method for generating labyrinth curves, according to an embodiment of the present invention.

Main steps of a method for generating labyrinth curves according to an embodiment of the present invention are shown in FIG. 1. The method includes an initialization step 100 in which curve evolution parameters are initialized as well as a curve network including one or more curves. Each curve is evolved by iterating steps 102, 104, 106 as long as a decision is made at step 108 to continue the evolution. When the evolution is stopped, a post-evolution processing 110 is performed. Step 102 of the iterative process allows the curve network and evolution parameters to be modified by a user so that the evolution can be interactively guided as it progresses. In step 104 the curve is resampled to increase the uniformity of spacing between adjacent point samples of the curve, and in step 106 the curve is spatially modulated in accordance with the curve evolution parameters.

The effect of the iterative process shown in FIG. 1 is to evolve an initialized curve into an evolved curve, as shown in FIGS. 13A-D, which illustrate four stages in the evolution of a curve. An initial curve 1300 shown in FIG. 13A evolves after numerous iterations into curve 1302 in FIG. 13B, which evolves further into curve 1304 in FIG. 13C, and finally into evolved curve 1306 in FIG. 13D. As is evident from this sequence of figures, the evolved curve has an increased geometric complexity. In the present context, geometric complexity is related to increasing curve length and number of inflection points.

Figure 21A:
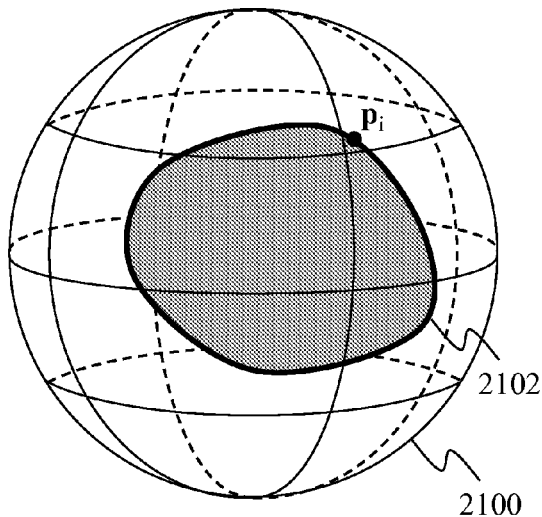
FIGS. 21A-D are diagrams illustrating evolution of a curve on a curved surface and evolution of a curve in a three dimensional space with surfaces defining boundaries, according to an embodiment of the present invention.
Figure 21B:
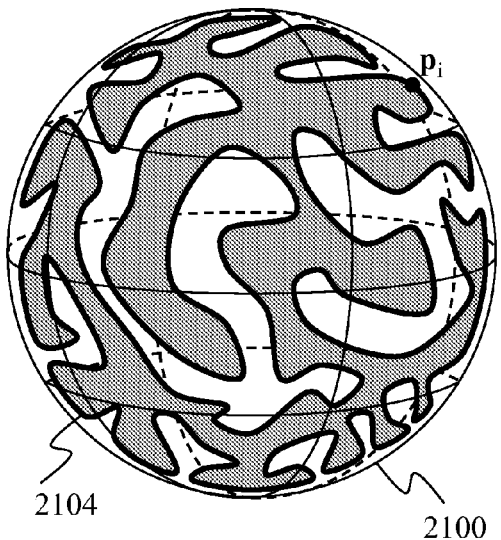
Figure 21C:
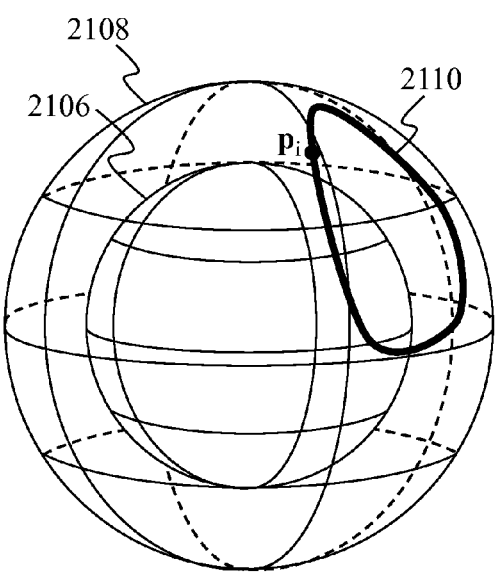
Figure 21D:
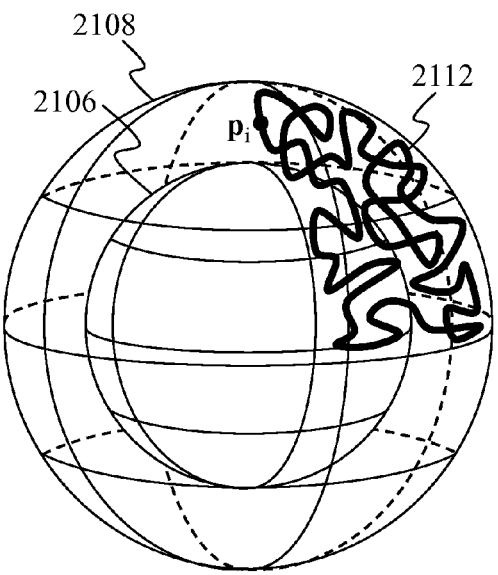

The curve is preferably represented as a piecewise linear curve composed of a linearly ordered set of sample points. For example, initial curve 1300 in FIG. 13A contains sample points $p_{i-1}$, $p_i$, $p_{i+1}$. The curve and its sample points are embedded in an evolution space having a dimension of at least two and are constrained within the evolution space during the evolution. The evolution space may be, for example, a two-dimensional Euclidean space, such as the rectangular region 1308 shown in FIGS. 13A-D. Alternatively, the evolution space may be a two-dimensional non-Euclidean space embedded in a three-dimensional Euclidean space, such as the sphere 2100 shown in FIGS. 21A-B. Initial curve 2102 in Fig. A evolves within the two dimensional surface of sphere 2100 into evolved curve 2104 in FIG. 21B. The evolution space may also be a three-dimensional Euclidean space, such as the volumetric region bounded by two spheres 2106 and 2108 shown in FIGS. 21C-D. Initial curve 2110 in FIG. 21C evolves within the three dimensional space between spheres 2106 and 2108 into evolved curve 2112.

Figure 14A:
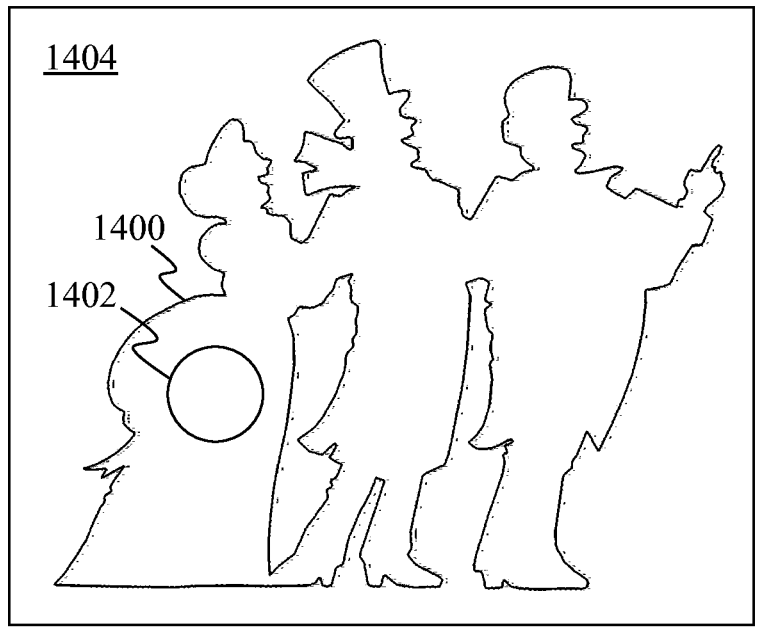
FIGS. 14A-B are diagrams illustrating the evolution of a curve within a boundary, according to an embodiment of the present invention.

Spheres 2106 and 2108 are examples of boundaries which are used serve to constrain curve evolution to a subspace of the evolution space. A boundary is a geometric object in the evolution space having a dimension one less than the evolution space dimension. For example, a boundary in a three dimensional evolution space is a two dimensional surface. This was illustrated above by two dimensional surfaces 2106 and 2108 in three dimensional evolution space of FIGS. 21C-D. In a two dimensional evolution space, a boundary is a one dimensional curve, as illustrated by the one dimensional boundary curve 1400 in two dimensional evolution space 1404 of FIGS. 14A-B. The boundary 1400 constrains the evolution of curve 1402 in FIG. 14A to the two dimensional subspace enclosed by the boundary, resulting in evolved curve 1406 in FIG. 14B which is contained within the region enclosed by boundary curve 1400.

Figure 2:
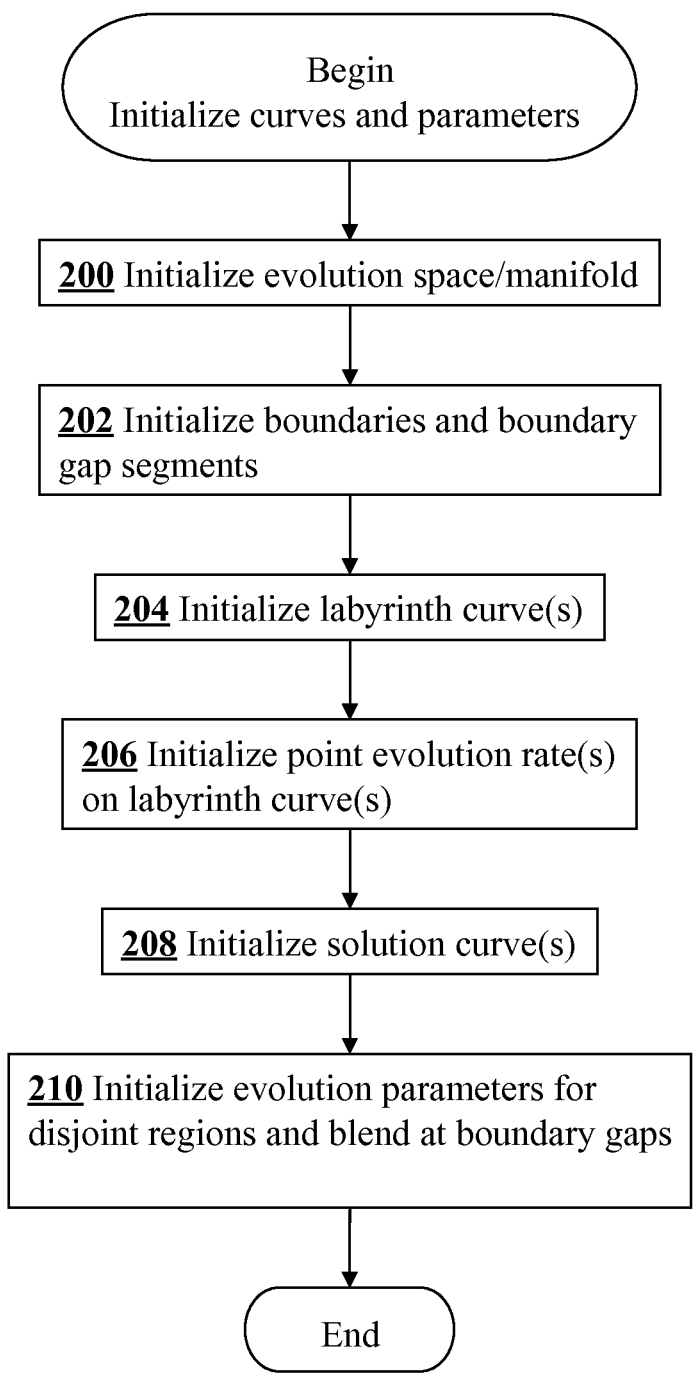
FIG. 2 is a flow chart illustrating steps of a curve and parameter initialization routine, according to an embodiment of the present invention.
Figure 31A:
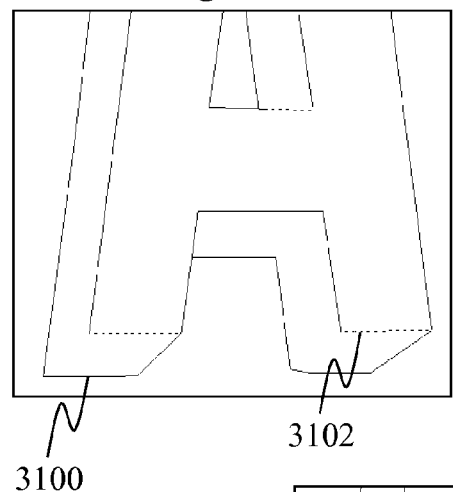
FIGS. 31A-D are diagrams illustrating the process of blending parameter functions near boundary gap curves to obtain smooth transitions in the evolved curves between different regions.
Figure 31B:
Figure 31C:
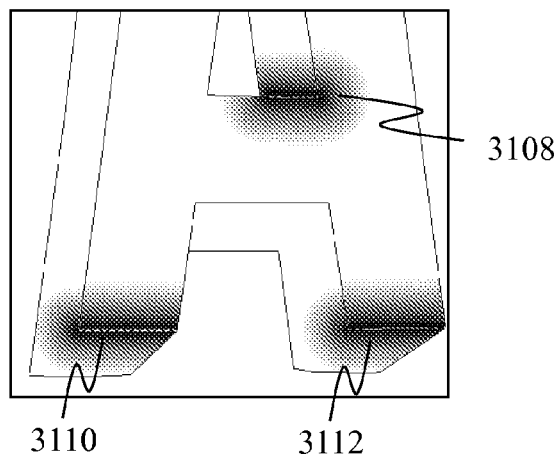
Figure 31D:
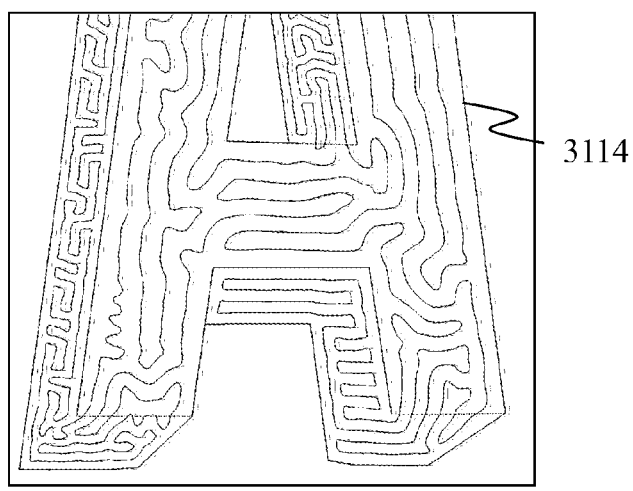

Prior to curve evolution, a routine initializes curves, boundaries, and evolution parameters, as shown in FIG. 2. The evolution space is selected and initialized in step 200 where the dimension of the space is defined and, in the case of a non-Euclidean space, it is further defined, e.g., as a parametric surface or surface mesh embedded in three dimensional Euclidean space. At step 202 boundaries and boundary gaps may be drawn by a user or automatically selected, resulting in distinct regions of the evolution space. FIG. 31A shows a network of boundary and boundary gap curves drawn by the user. The boundary curves, such as curve 3100, are shown as solid lines and the boundary gap curves, such as curve 3102, as dashed lines. These curves were drawn manually. FIG. 32B shows feature edges, such as edge 3200, extracted from the image in FIG. 32A, automatically computed by running an image processing edge detection filter. These edges were used to automatically compute boundary curves that were used in the evolution of the curve 3202 shown in FIG. 32C. Similarly, an initial curve may be drawn or automatically created in each of the regions of the evolution space. For example, by default, a circle may be automatically created in each region. In another illustration, FIG. 33A shows a triangle 3300 which evolves into labyrinth 3302 shown in FIG. 33B. FIG. 33C shows three intersecting lines 3304 appearing almost identical to the triangle 3300 in FIG. 33A but which evolve into very different labyrinth curve 3306 shown in FIG. 33D. The curve network may include multiple curves embedded in the evolution space. In this case, the iterative process evolves each curve. In step 206 of FIG. 2, a point evolution rate may be defined and associated with one or more selected sample points of a curve. The point evolution rate serves to inhibit displacement of the selected sample point during evolution for a proportion of iterations that is dependent upon the point evolution rate. For example, a point whose evolution rate is set to zero is effectively frozen and is not displaced by the evolution process (unless its evolution rate is modified by the user or it is edited by the user). A solution curve may be selected in step 208 to enforce a desired solution path through the evolved labyrinth curve. A solution curve is defined and behaves like a boundary curve, with the exception that it has half the repulsion radius of a boundary curve. Various evolution parameters are defined in step 210. In a preferred embodiment, the evolution parameters include global scalar values, such as an average point spacing D and resampling threshold parameters $k_{max}$ and $k_{min}$, as well as functions whose values vary from location to location in the evolution space. These functions, which are used to spatially modulate the curve evolution in specific ways, are typically real-valued scalar functions, but may also be vector fields or other functions defined on the evolution space. Any of these functions may be defined by combining functions defined on distinct regions of the evolution space. If such a function has a discontinuity at a boundary where a boundary gap is present, the function may be modified automatically near the boundary gap to create continuous transition. For example, if a function is defined by combining two images positioned in adjacent regions of the evolution space separated by a boundary curve with a boundary gap, then the two images may be blurred or blended near the boundary gap to create a more continuous transition in the function. FIG. 31A shows a set of boundary and boundary gap curves, such as boundary curve 3100 and boundary gap 3102, defining several regions. FIG. 31B illustrates a curve parameter with different values in each region, where the function values are indicated by different shades of grey. Regions 3104 and 3106, for example, have different shades of grey corresponding to different values of the parameter function. FIG. 31C shows blend regions 3108, 3110, 3112 near the boundary gap curves. The width of these regions is set by default but can be edited by the user. These blend regions are the areas where curve evolution parameters are blended, e.g., using a weighted average based on the distance from the boundary gap curves, such as curve 3102. FIG. 31D shows a single curve 3114 evolved from the blended parameters. Note the distinct pattern styles in the different regions and the smooth transitions where the evolved curve crosses the boundary gaps.

Figure 3:
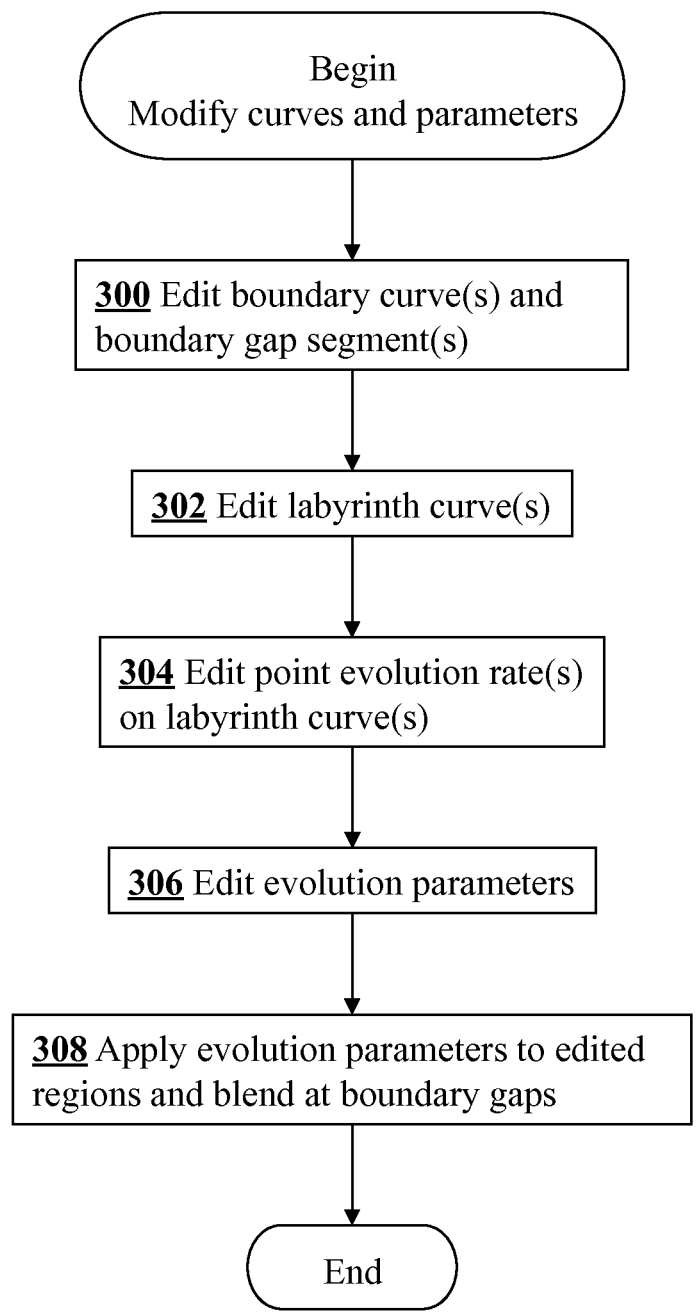
FIG. 3 is a flow chart illustrating steps of a routine to allow curves and parameters to be modified by a user, according to an embodiment of the present invention.

After the initialization is complete, each curve is evolved using an iterative process, where each iteration includes steps 102, 104, 106 of FIG. 1. Preferably, while the curve is evolving in the iterative process, it is rendered and displayed to the user in real time so the user can observe the evolution process. At any point in the process, the user may interrupt the evolution using a graphical user interface and modify a curve or evolution parameter, as indicated by step 102. The details of this step are shown in FIG. 3. The solution curve, boundary curve(s) and boundary gap(s) are allowed to be edited by the user in step 300, e.g., using a graphical user interface to select sample points of the curves and then move them or otherwise change their properties. Similarly, step 302 allows the evolving labyrinth curves to be edited by the user, and step 304 allows point evolution rates for sample points of the curve to be edited by the user, e.g., using a pop-up slide bar graphical user interface element. The evolution parameters may be modified in step 306. Global scalar parameters may be edited, for example, using slide bar graphical user interface elements. Functions defined on the evolution space may be edited by modifying them in specific regions, applying local or global transformations to them, replacing them with completely different definitions, or otherwise modifying them. If one or both functions meeting a boundary gap have been modified, blending may be performed in step 308 to create a smooth transition.

Figure 4:
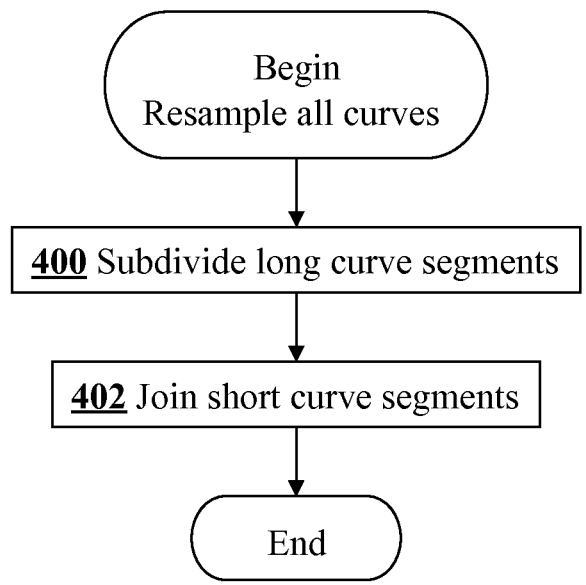
FIG. 4 is a flow chart illustrating steps of a curve resampling routine, according to an embodiment of the present invention.
Figure 12:
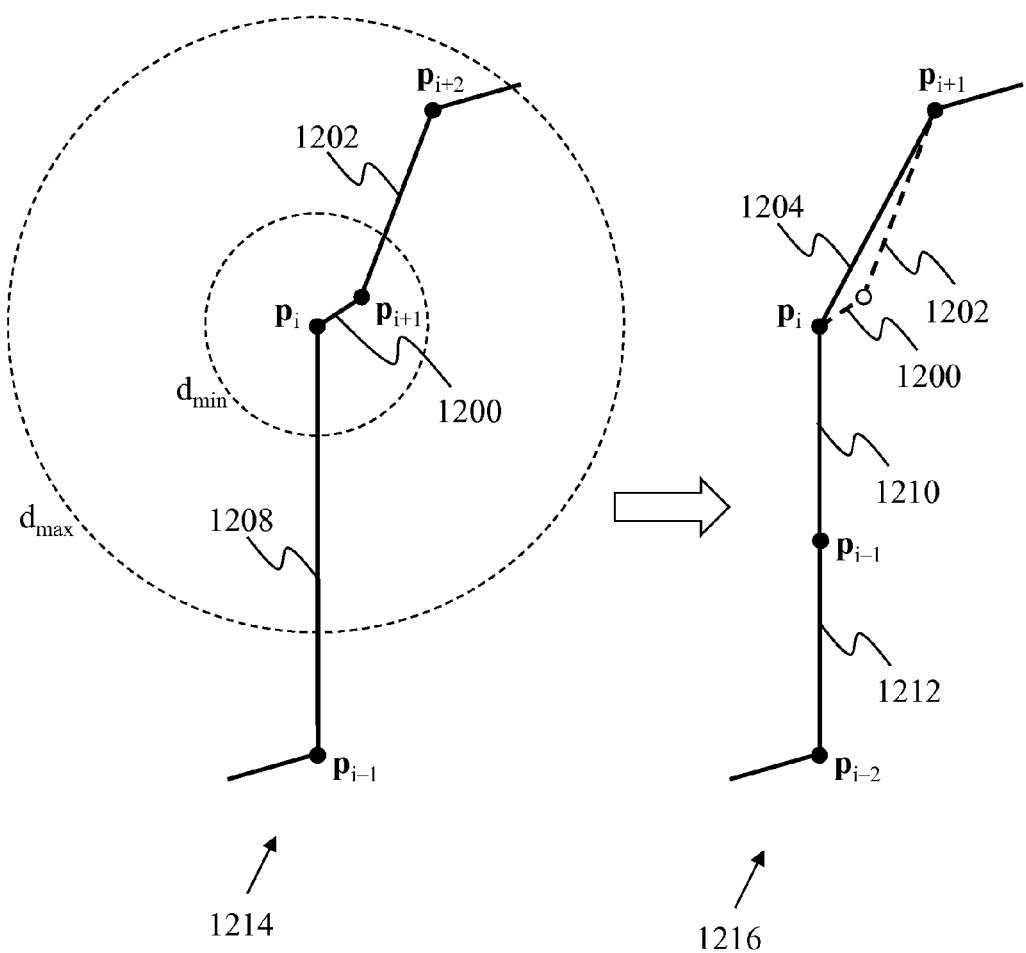
FIG. 12 is a diagram illustrating resampling of sample points on a curve, according to an embodiment of the present invention.

During each iteration, the curve is preferably resampled using the routine shown in FIG. 4. In addition, if boundary curves and solution curves have been modified, they are also preferably resampled. Resampling includes adding sample points to subdivide curve segments whose length is greater than a maximum threshold distance, and shown in step 400, and removing sample points to delete curve segments whose length is less than a minimum threshold distance, as shown in step 402. FIG. 12 is a diagram illustrating an example of resampling of sample points on a curve 1214 to produce a resampled curve 1216. In this example, curve 1214 has segment 1200 that is shorter than a minimum threshold distance and segment 1208 that is longer than a minimum threshold distance. Consequently, point $p_{i+1}$ is removed from curve 1214 so that short segment 1200 is joined with adjacent segment 1202 to form a single segment 1204 of resampled curve 1216. In addition, long segment 1208 of curve 1214 is subdivided into two shorter segments 1210 and 1212 of curve 1216 by adding a new point $p_{i-1}$. The maximum threshold distance and the minimum threshold distance are preferably spatially-dependent functions computed from a spatially-dependent real-valued scaling function $\delta$ defined on the evolution space, so that the resampling level of detail is spatially modulated by the evolution parameters. More specifically, the maximum threshold $d_{max}$ and minimum threshold distance $d_{min}$ for a segment connecting points $p_i$ and $p_{i+1}$ may be calculated according to the equations $$d_{max}=k_{max} \cdot D \cdot [\delta(p_i)+\delta(p_{i+1})]/2,$$

and $$d_{min}=k_{min} \cdot D \cdot [\delta(p_i)+\delta(p_{i+1})]/2,$$

where $k_{max}$ and $k_{min}$ are globally uniform sampling threshold parameters and D is a globally uniform average sample separation distance which may be adjusted to control the global sampling density.

Figure 5:
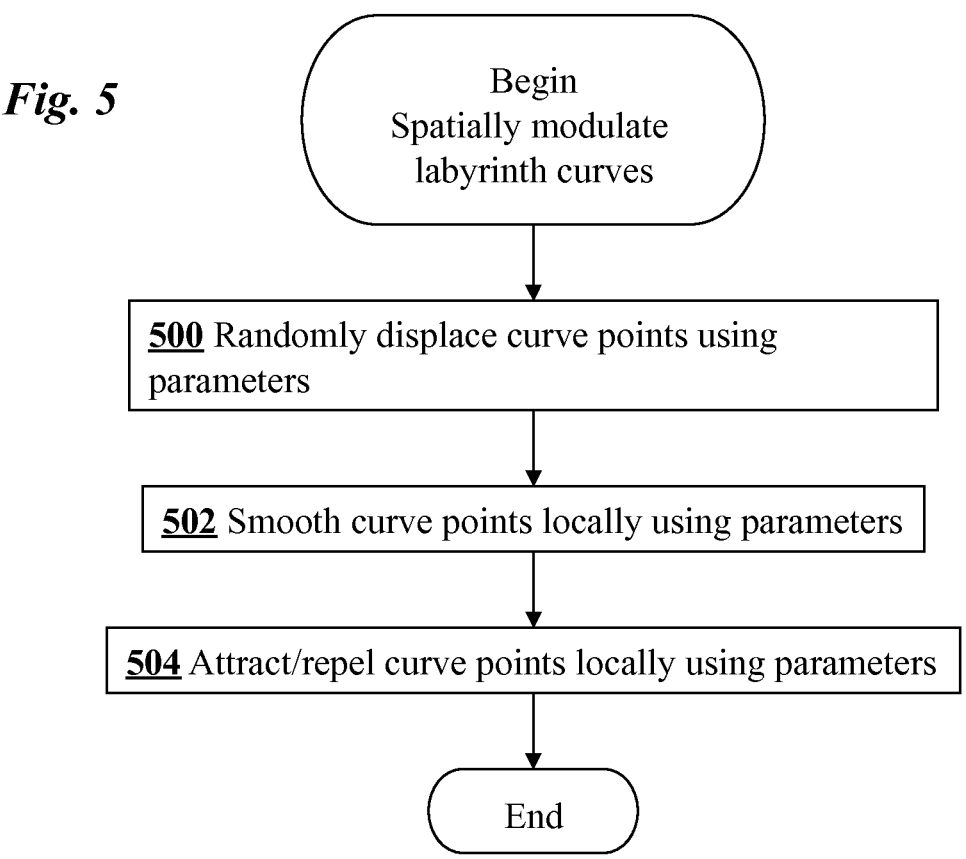
FIG. 5 is a flow chart illustrating steps of a curve evolution routine, according to an embodiment of the present invention.

In addition to user modifications and curve resampling, each iteration also includes a key step of the curve evolution in which the curve is spatially modulated by the curve evolution parameters. The main steps of this spatial modulation are shown in FIG. 5. It involves computing a random displacement for each of the sample points of the curve, as shown in step 500, computing a smoothing displacement for each of the sample points of the curve, as shown in step 502, and computing an attraction-repulsion displacement for each of the sample points of the curve, as shown in step 504.

Figure 8:
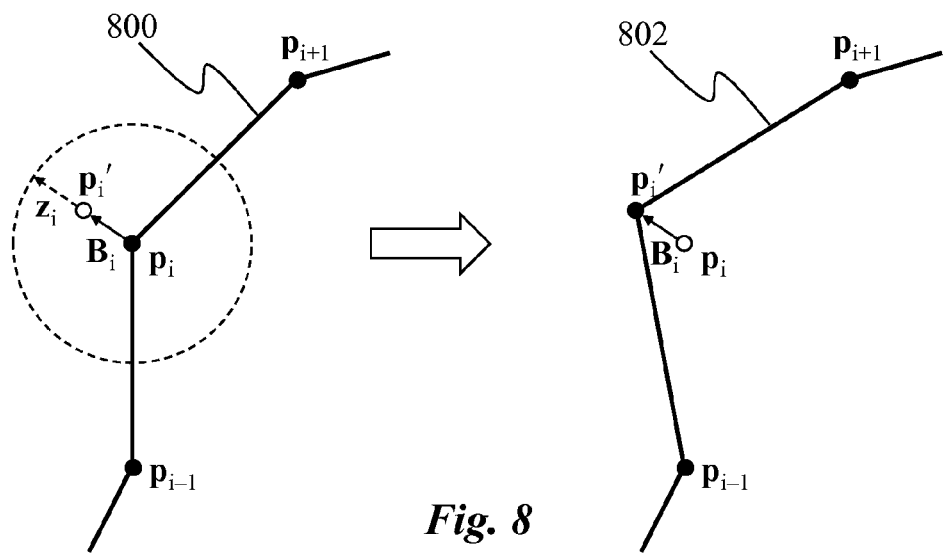
FIG. 8 is a diagram illustrating a random displacement of a sample point on a curve, according to an embodiment of the present invention.

FIG. 8 is a diagram illustrating a random displacement of a sample point $p_i$ on a curve, changing curve 800 before the displacement of sample point $p_i$ to curve 802 after the sample point $p_i$ is randomly displaced to its new position $p_i'$ by a random displacement vector $R_i$. The random displacement preferably simulates a Brownian motion. It may be computed from a stochastically selected random offset vector $z_i$ whose magnitude is scaled by the average point displacement parameter D, the spatially-dependent scaling function $\delta$, and a spatially-dependent randomness strength function $f_R$ defined on the evolution space. For example, $$R_i=f_R(p_i) \cdot \delta(p_i) \cdot D \cdot z_i.$$

The function $f_R$, like δ, is a positive real-valued function whose values depend on the sample point. Thus, it serves to spatially modulate the random displacements of the curve so that sample points on the curve experience larger or smaller random displacements depending on their locations in the evolution space. If the values of are defined by an image, for example, the evolved curve will have more randomness in areas corresponding to larger intensities in the image.

Figure 9:
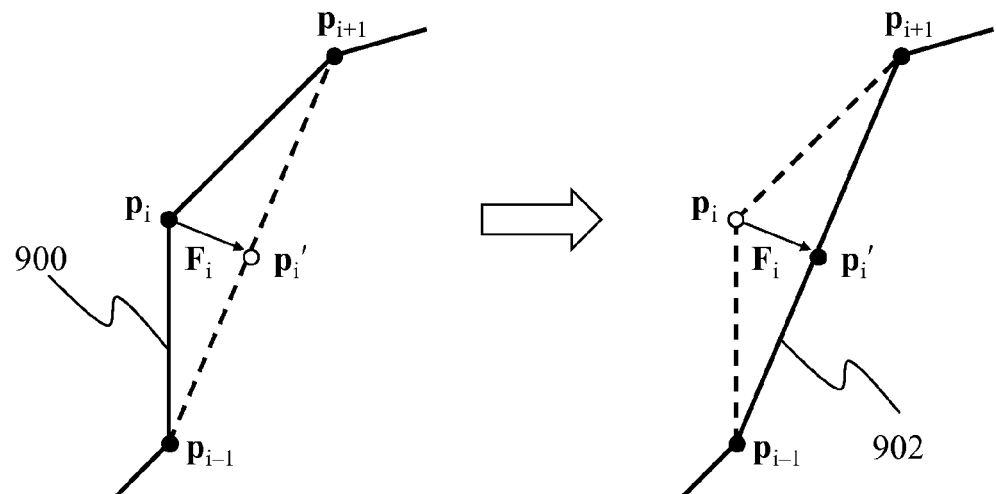
FIG. 9 is a diagram illustrating a smoothing displacement of a sample point on a curve, according to an embodiment of the present invention.

FIG. 9 is a diagram illustrating a smoothing displacement of a sample point $p_i$ on a curve, changing curve 900 before smoothing displacement of sample point $p_i$ to curve 902 after the sample point $p_i$ is displaced to its new position $p_i'$ by a smoothing displacement vector $S_i$. This displacement vector may be computed from a weighted average of adjacent points, scaled by a spatially-dependent smoothness function $f_S$ defined on the evolution space:

$$S_i = f_S(p_i) \cdot \{[\delta(p_{i+1}) \cdot p_{i-1} + \delta(p_{i-1}) \cdot p_{i+1}]/[\delta(p_{i+1}) + \delta(p_{i-1})] - p_i\}.$$

Because the function $f_S$ is a positive real-valued function whose values depend on the sample point, it serves to spatially modulate the smoothness displacements of the curve so that sample points on the curve are more or less smoothed depending on their locations in the evolution space. Note also that the average of the two adjacent points is weighted by the spatially-dependent scaling function δ, so that this also provides spatial modulation of smoothness.

Figure 10:
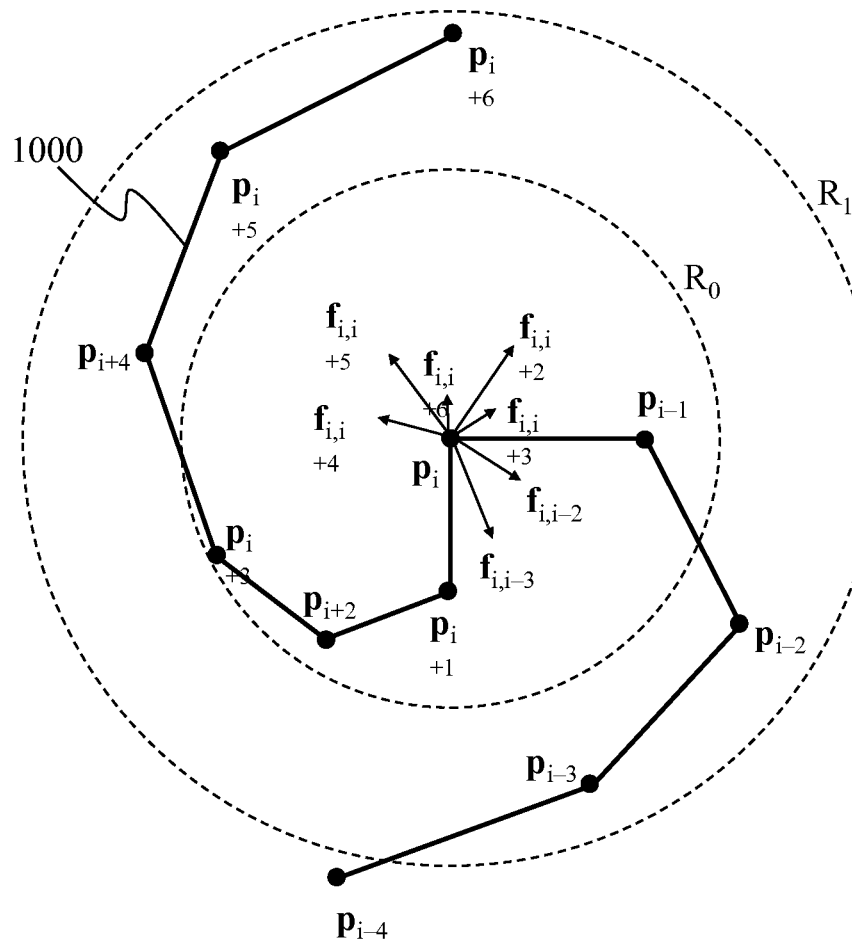
FIG. 10 is a diagram illustrating an attraction-repulsion displacement of a sample point on a curve, according to an embodiment of the present invention.

FIG. 10 is a diagram illustrating an attraction-repulsion displacement of a sample point $p_i$ on a curve 1000. A net attraction-repulsion displacement $A_i$ for point $p_i$ is a vector sum of a set of attraction-repulsion displacements $\{f_{i,j}\}$ between $p_i$ and a set of neighboring points $p_j$, scaled by a spatially-dependent attraction-repulsion strength function $f_A$ defined on the evolution space:

$$A_i = f_A(p_i) \cdot \Sigma f_{i,j},$$

where the sum is over all indices j of points $p_j$ located in a neighborhood of point $p_i$. A point $p_j$ is included in this neighborhood of $p_i$ if the distance between the two points is less than a predetermined radius of attraction $R_1$, i.e., $r_{i,j} = |p_i - p_j| < R_1$. The distance function here represented by $\|\ \|$ may be a Euclidean distance or a surface distance that estimates a geodesic, as will be described in more detail later. Preferably, the adjacent points $p_{i-1}$ and $p_{i+1}$ are not included in the neighborhood so as to avoid numerical instabilities. The computed attraction-repulsion displacement $f_{i,j}$ between two points on the curve is an attraction if the two points are separated by a distance greater than a predetermined transition distance $R_0 < R_1$. If the two points are separated by a distance less than $R_0$, then the displacement is a repulsion. That is, if $R_1 < r_{i,j}$ or $j = i \pm 1$ then $f_{i,j}$ is zero
if $0 < r_{i,j} < R_0$ then $f_{i,j}$ is a repulsion
if $R_0 < r_{i,j} < R_1$ then $f_{i,j}$ is an attraction.

Preferably, the values of $R_0$ and $R_1$ are functions of the spatially dependent scaling function δ, the average sample point separation distance D, and global threshold parameters $k_0$ and $k_1$. For example, local values of $R_0$ and $R_1$ used to compute $f_{i,j}$ may be calculated from the equations $$R_0 = \min\{\delta(p_i), \delta(p_j)\} \cdot D \cdot k_0$$

$$R_1 = \min\{\delta(p_i), \delta(p_k)\} \cdot D \cdot k_1.$$

The displacements $f_{i,j}$ therefore are spatially modulated by the scaling function δ. In addition, the net attraction-repulsion displacement $A_i$ is scaled by the spatially-dependent function $f_A$. Consequently, the displacement $A_i$ is spatially modulated, resulting in local variations of the attraction-repulsion displacements during evolution.

Figure 11:
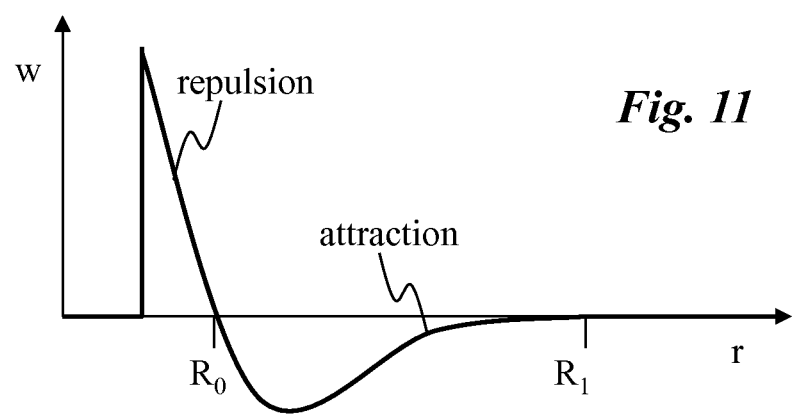
FIG. 11 is a graph of displacement w vs. point separation distance r illustrating how the strength of attraction-repulsion displacement varies with distance between points, according to an embodiment of the present invention.

The magnitude of the attraction-repulsion displacement $f_{i,j}$ between two points may be computed from a predetermined function w that maps point separation distance r to an attraction-repulsion displacement value. For example, FIG. 11 is a graph of displacement w vs. point separation distance r illustrating how the strength of attraction-repulsion displacement varies with distance r between points. A function w having this form may be conveniently calculated from a Lennard-Jones potential:

$$w(r) = (\sigma/r)^{12} - (\sigma/r)^6,$$

where σ is a parameter controlling the shape of the function. The shape of this function w as well as the values of $k_0$ and $k_1$ may be considered evolution parameters that can be initialized with different values and adjusted during curve evolution.

In preferred implementations, computing the attraction-repulsion displacement for a given point involves determining all curve points within a given neighborhood of that point (e.g., all points less than a predetermined distance from the point). A spatial data structure, preferably a k–d tree, is used to accelerate this determination.

In some embodiments, to modulate curve orientation the net attraction-repulsion displacement $A_i$ is modified according to a gradient field $\nabla f_G$ defined on the evolution space. This gradient field may be defined directly or derived from an anisotropy function $f_G$. In one implementation, the modified attraction-repulsion displacement $A_i'$ may be calculated by scaling $A_i$ in the direction of a gradient field $\nabla f_S$ according to $$A_i' = A_i + (\nabla f_G(p_i) \cdot A_i)(\nabla f_G(p_i)/|\nabla f_G(p_i)|).$$

Figure 14B:
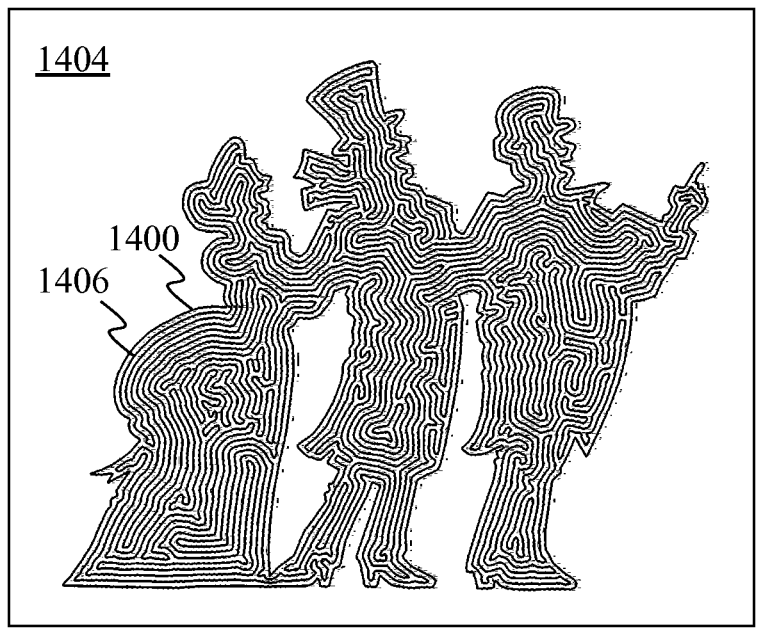

An illustration of an evolved curve modulated by anisotropy is shown in FIG. 14B. In that example, the anisotropy function is defined as the distance to the nearest boundary. Consequently, the labyrinth curves evolve to align more parallel to the boundary than they otherwise would.

If the curve network includes a boundary, the net attraction-repulsion displacement $A_i$ for a point $p_i$ on the curve also includes displacements $f_{i,j}$ between the sample points of the curve and boundary sample points in the neighborhood of $p_i$. These curve-boundary displacements $f_{i,j}$ may be computed using the same technique described above for curve-curve displacements. However, if the curve network contains a boundary gap, then the curve-boundary displacement calculation is modified so that the attraction-repulsion between the sample points of the curve and the boundary sample points for boundary sample points in the boundary gap is weakened. If a boundary gap is defined to reduce the boundary strength to zero, the effect of this weakening is to allow the curve to evolve across the boundary.

Figure 22A:
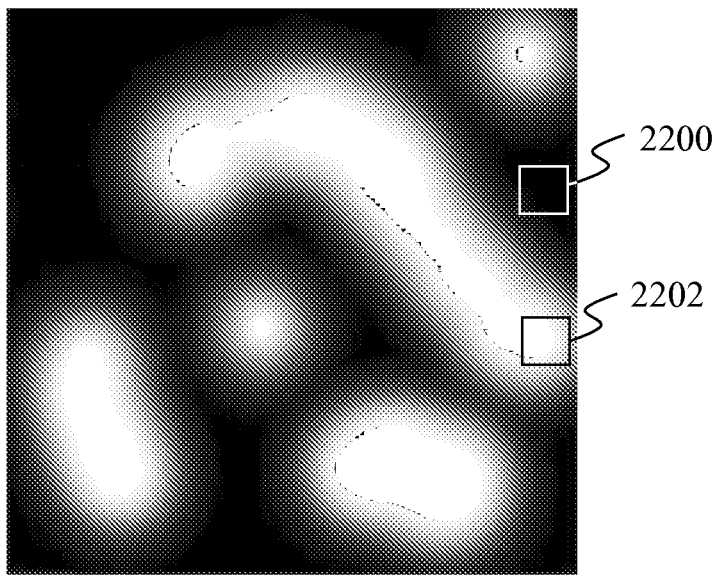
FIGS. 22A-B are diagrams illustrating a curve evolution function and a resulting labyrinth curve spatially modulated by the function.
Figure 22B:
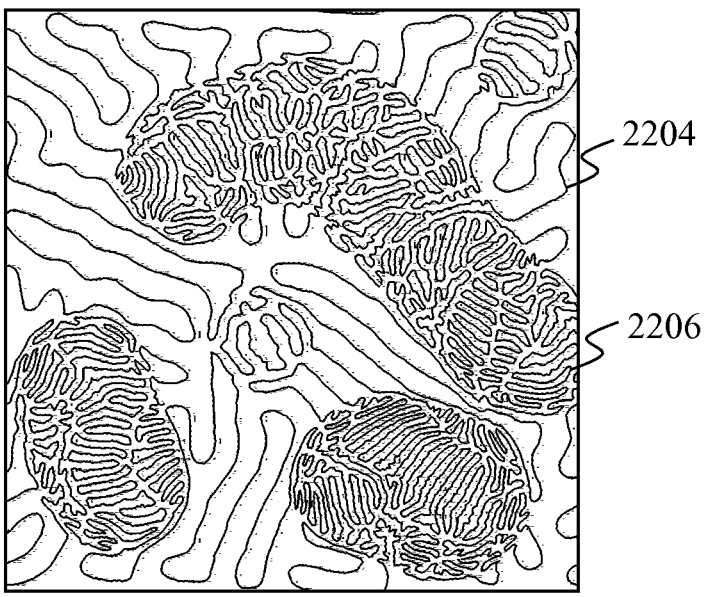

An illustration of how evolution parameters can spatially modulate the evolution of a labyrinth curve is shown in FIGS. 22A-B. The image shown in FIG. 22A is used to define spatially-dependent scaling function δ used as one of the curve evolution functions to evolve a curve in a plane. Darker portions of the image such as the portion contained in square 2200 correspond to small values of the function δ while lighter portions of the image such as the portion contained in square 2202 correspond to large values of the function δ. FIG. 22B shows an evolved labyrinth curve spatially modulated by the function δ shown in FIG. 22A. As is evident from a visual comparison of the figures, where the function δ has larger values, the curve is modulated more at smaller scales resulting in a higher level of detail. For example, portion 2204 of the curve has a lower level of detail due to the low-intensity of corresponding portion 2200 of the image, and portion 2206 of the curve has a higher level of detail due to the high-intensity of corresponding portion 2202 of the image. To obtain an evolved labyrinth such as that shown in FIG. 22B, the function δ is preferably first set to 1.0 everywhere. After a coarse set of curves has evolved to fill the evolution space, the function δ is changed to have the values shown in FIG. 22A, so that some regions have values of δ less than 1.0. The curve evolution is then continued with the new δ parameter until the curve network is stable. Alternatively, the function δ can be gradually changed in a step-wise manner from a uniform 1.0 value to the non-uniform distribution shown in FIG. 22A. Specifically, after the function δ is changed by one step, the curve evolution is continued until the evolved curve has stabilized, and then δ is changed by another step. This step-wise evolution is repeated until the labyrinth has reached the desired complexity.

Figure 15:
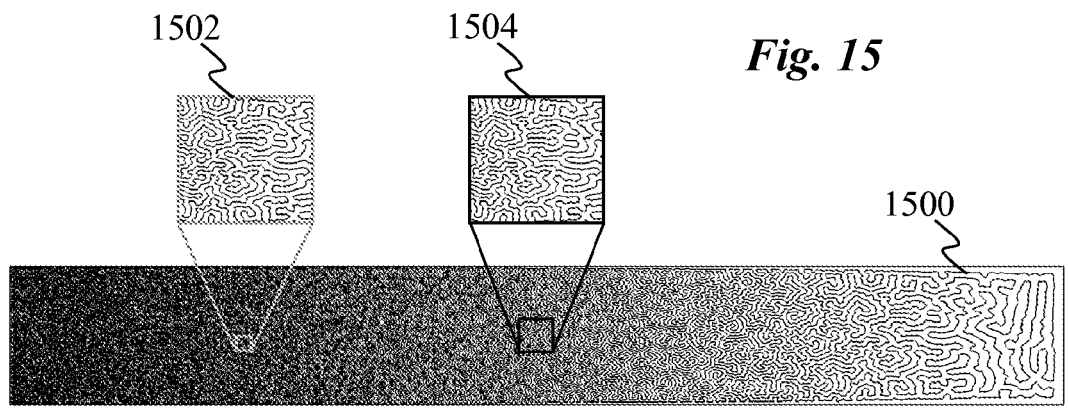
FIG. 15 is a diagram of an evolved curve spatially modulated by a monotonic function to illustrate half-toning using labyrinth curve, according to an embodiment of the present invention.
Figure 16:
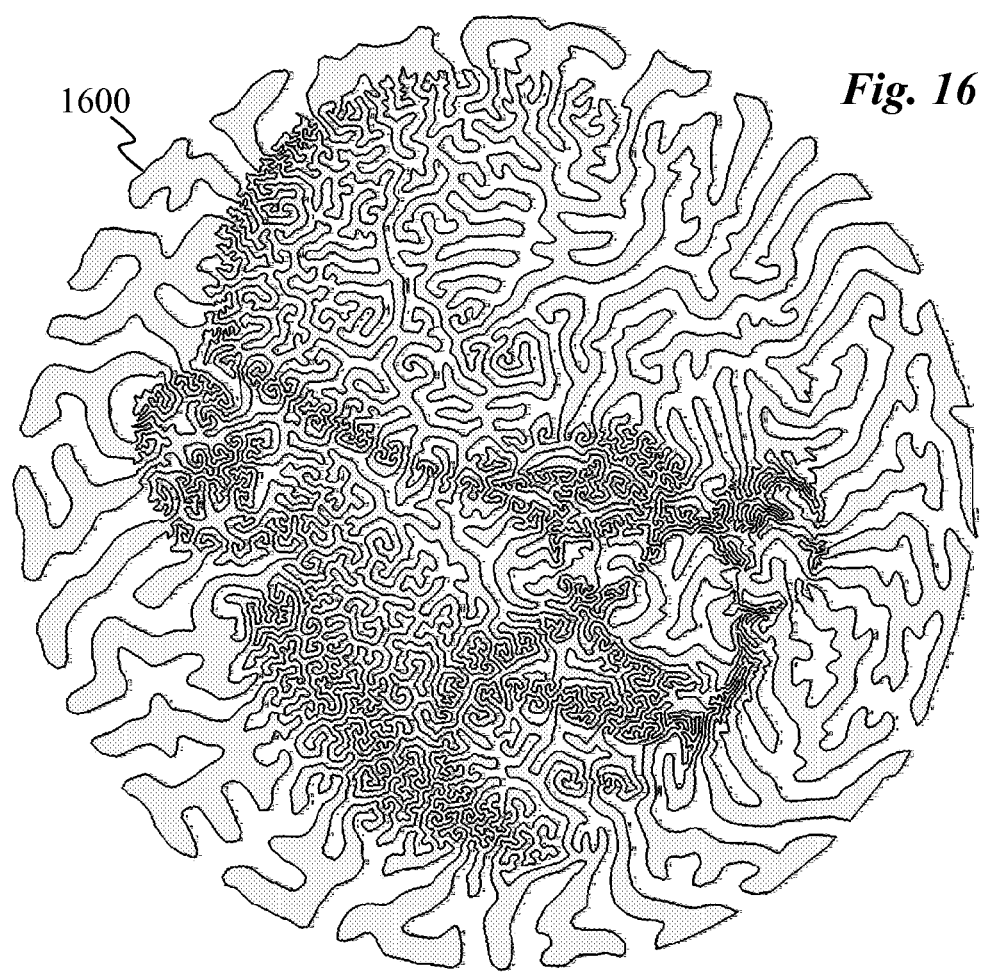
FIG. 16 is a diagram of an evolved curve spatially modulated by a function derived from an image, according to an embodiment of the present invention.

In a similar application, FIG. 15 is a diagram of an evolved curve 1500 that has been spatially modulated by a scaling function δ that is constant vertically and monotonically decreases horizontally from left to right. Consequently, the evolved curve 1500 has a high density of detail on the left in portion 1502, gradually decreasing toward the right in portion 1504. This example illustrates how labyrinth curves can be used for half-toning applications. A practical application of this principle is shown in FIG. 16 which contains a diagram of an evolved curve 1600 that has been spatially modulated by a scaling function δ derived from an image. In this case, the values of the function δ are obtained from the negative image, so that high intensities (lighter areas) in the original image result in a low level of curve detail, while low intensities (darker areas) in the original image result in a high level of curve detail.

Figure 6:
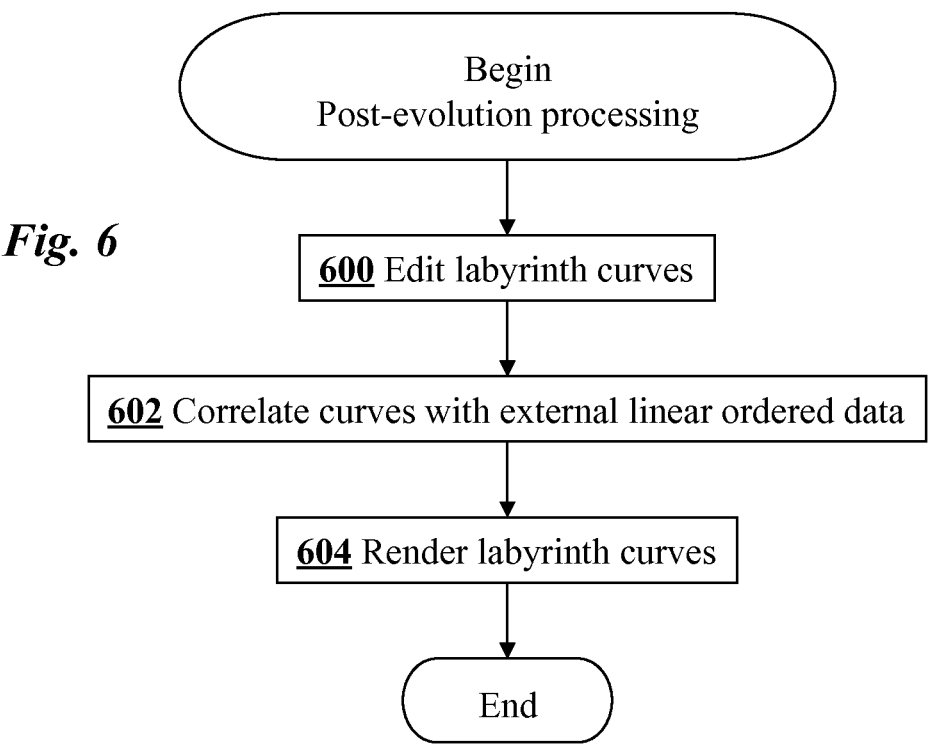
FIG. 6 is a flow chart illustrating steps of a post-evolution process, according to an embodiment of the present invention.
Figure 18:
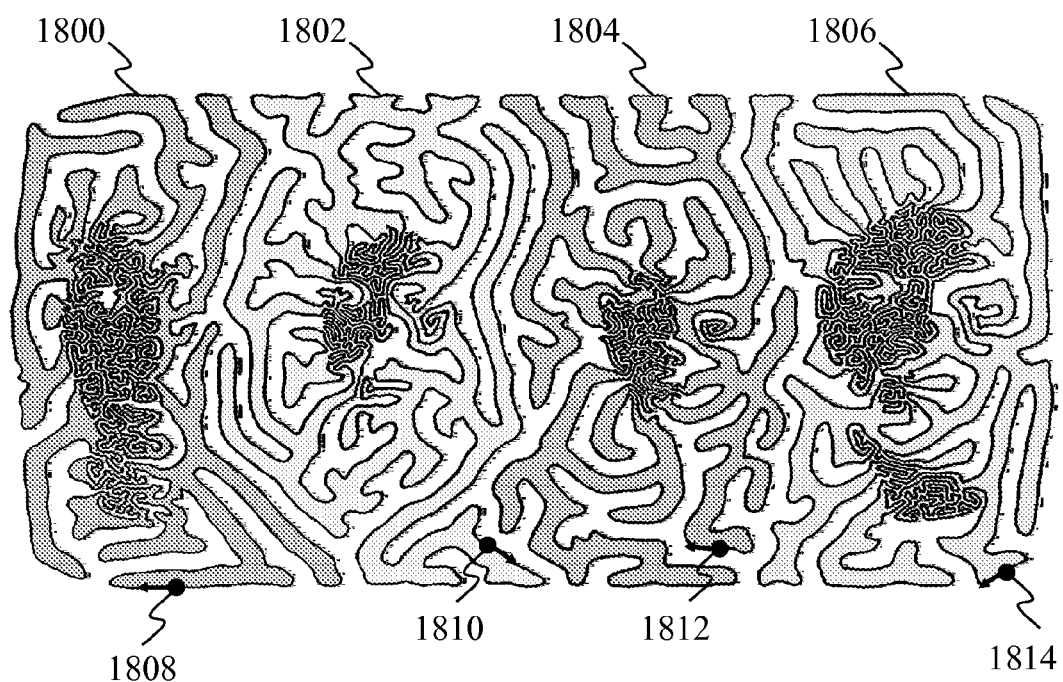
FIG. 18 is a diagram illustrating four evolved curves spatially modulated by images of four musicians implementing a user interface for navigating four audio tracks, according to an embodiment of the present invention.

Evolved curves produced by the iterative evolution process may be further edited and/or processed to be used for various applications. For example, FIG. 6 is a flow chart illustrating steps of one post-evolution process for applications in which an evolved curve is used to parameterize a set of linearly ordered data. In step 600 the evolved labyrinth may be edited if desired to suit the particular application. The edited curve is then mapped to a set of linearly ordered data in step 602, i.e., by linearly mapping distances along the length of the evolved curve to the linearly ordered data in a one-to-one correspondence. In step 604 the curve is then rendered and can be used to provide a user interface allowing the linearly ordered data to be navigated using the rendering of the evolved curve. For example, FIG. 18 is a diagram illustrating four evolved curves 1800, 1802, 1804, 1806 spatially modulated by four images of four musicians. These evolved curves are then separately mapped to four audio tracks. The rendered curves and the mapping may then be used to implement a user interface for navigating the audio. For example, the currently playing section of each audio track may be indicated by four dots 1808, 1810, 1812, 1814 which move along the lengths of the four curves 1800, 1802, 1804, 1806, respectively, as the tracks play. The user may drag the dots to different positions along the curve to change the currently playing section of the audio tracks. The rendered curves may also be modulated by the audio track signals in real time as the audio tracks play. For example, the intensity of the region enclosed by a rendered curve can be increased in proportion with the volume level of the currently playing audio of the track mapped to the curve.

Since the evolved curves are represented as line segments, they can be saved as vector art to a data file on a storage medium, such as a hard drive or CD-ROM, and used as a stippling stitch design applicable to embroidery using computerized sewing machines. Preferably, in such applications the evolved curve network constitutes the boundaries of closed polygons that can be embroidered in different colors and textures. Textures can be modified by varying stitch types and parameters.

Figure 17:
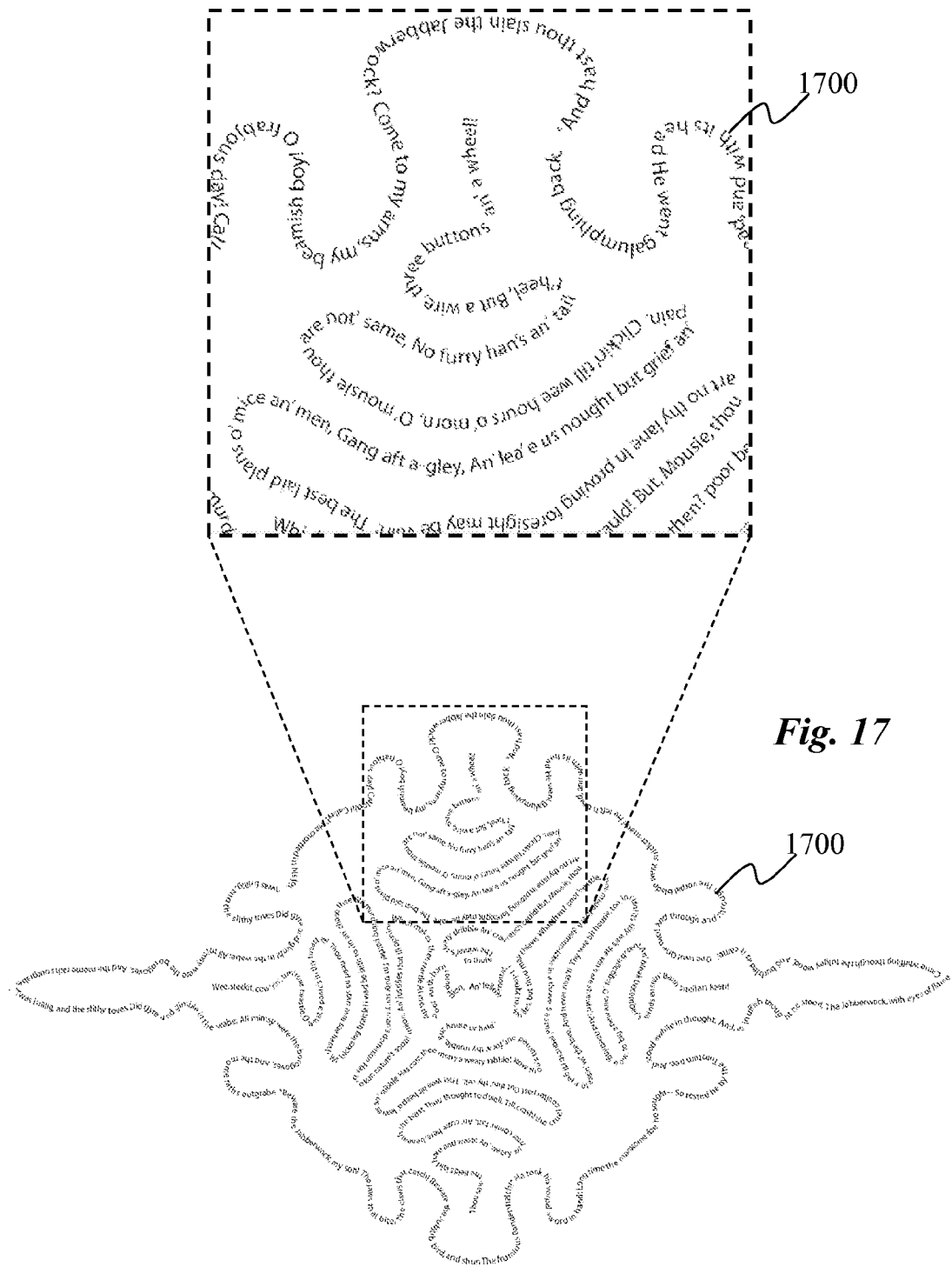
FIG. 17 is a diagram illustrating an evolved curve rendered by linearly mapping a string of text to the evolved curve, according to an embodiment of the present invention.

Another application involving linear mapping to an evolved curve is illustrated in FIG. 17. In this example, an evolved curve is rendered by linearly mapping a string of text 1700 to the evolved curve. Each character of the text string is appropriately scaled and oriented to correspond with the alignment of the portion of the evolved curve to which it is mapped. The curve could be further mapped to an audio track of a reading of the text, or music in the case where the text string is musical lyrics. In one application, a user interface plays the audio track while the corresponding characters or words are animated.

The labyrinth curves can be used in the context of animation in at least two ways. First, the evolution process of curves from an initial configuration to a final one can be animated. FIGS. 29A-F show five initial curves transforming into a portrait labyrinth. For example, initial curve 2900 evolves through intermediate curves 2902, 2904, 2906, 2908 to produce the evolved curve 2910. Second, labyrinth curves can be animated by using video images instead of a still image as evolution parameter functions. For example, a new labyrinth may be created and played back for each frame of video with frame-to-frame coherence of the algorithm's parameters. An example of such frame-to-frame coherence would be the key framing of the initial labyrinth curves, boundary and boundary gap curves.

Figure 30A:
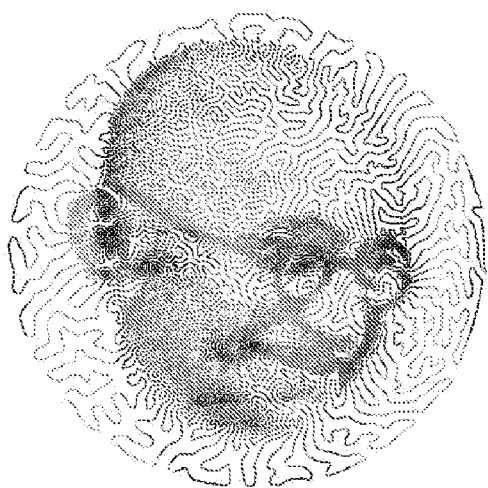
FIGS. 30A-D are diagrams that illustrate how an image can be used to color the geometry of a curve evolved from a different image.
Figure 30B:
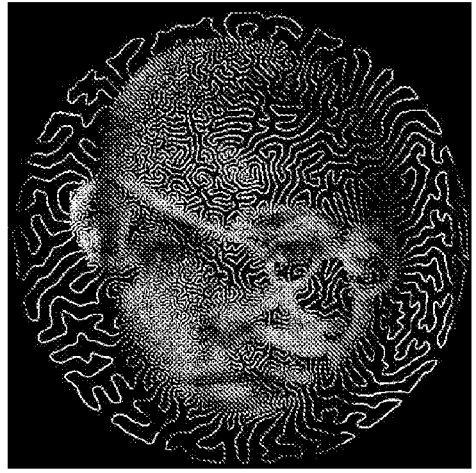
Figure 30C:
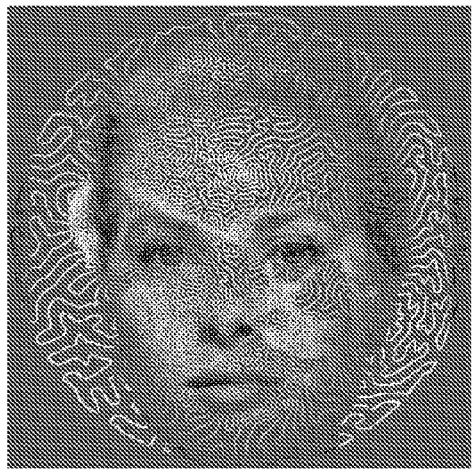
Figure 30D:
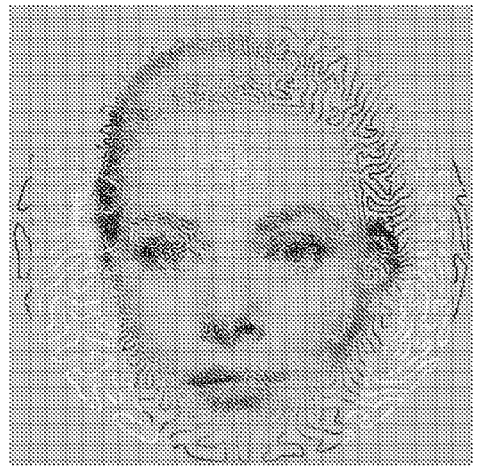
Figure 36A:
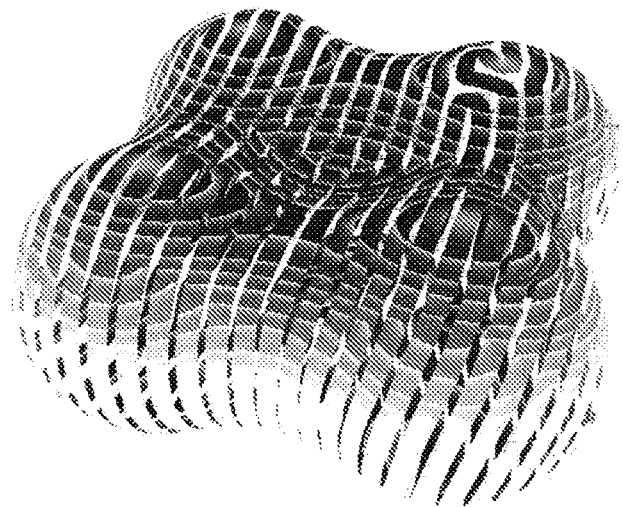
FIGS. 36A-B are diagrams illustrating evolved curves on non-Euclidean surface geometry, which can be used as a model to create stylized sculptures of 3D objects.
Figure 36B:
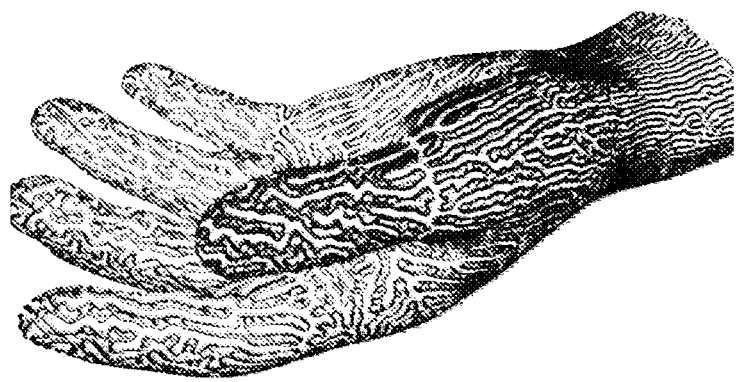

The rendering of an evolved curve may also be performed by selecting intensity values for rendered points of the evolved curve (and/or for points enclosed by the evolved curve) from corresponding points of an image projected onto the evolution space. The image may be, for example, the same image used to define a spatially-dependent evolution parameter, in which case the rendering may enhance the visual half-toning effect of the spatial modulation. Alternatively, the image used for rendering may be a different image, in which case the rendered curve acquires image properties independent of the shape of the evolved curve. This application may be considered as a mapping of the 2D image data to the 1D evolved curve, analogous to the mapping of 1D linear data to the 1D evolved curve as discussed above in relation to FIGS. 17 and 18. A two-dimensional example of this is shown in FIGS. 30A-D. Here, a female portrait image is mapped to the labyrinth curves shown in FIG. 29A to produce the rendered labyrinth of FIG. 30A whose shade of gray at any point is determined from the female portrait image. Varying the background color as shown in FIGS. 30B-D alters the contrast, controlling the perceptual prominence of the image used to evolve the labyrinth curve as compared to portrait image used to render the labyrinth curve. Similarly, three dimensional data may be mapped onto an evolved curve in a three dimensional evolution space, as shown in FIGS. 36A-B.

The algorithm for evolving labyrinth curves in the plane can be used directly on three dimensional surfaces. In three dimensions, all displacements are computed as three dimensional vectors instead of two dimensional vectors, and all sample points on curves remain constrained to the surface. In addition, boundaries and boundary gaps are two dimensional surfaces rather than one dimensional curves. The generalization from two dimensions to three dimensions is more complicated, but straightforward. Displacing a point on a surface is a well studied problem in geometry. Different techniques exist for surface representations such as meshes, parametric surfaces (such as NURBS), and algebraic surfaces. In each case, the displacement vector is projected to the tangent plane of the surface and a numerical integration scheme is used to the move point along the surface in the direction of the projected displacement. These techniques are well studied and known by skilled engineers familiar with three dimensional geometry algorithms.

Whereas the curve evolution parameters preferably are represented by images in the two dimensional case, the functions are preferably stored in (u,v)-texture maps or with mesh vertices for surfaces. Data structures for representing functions as textures are widely used in the field of computer graphics.

Figure 7:
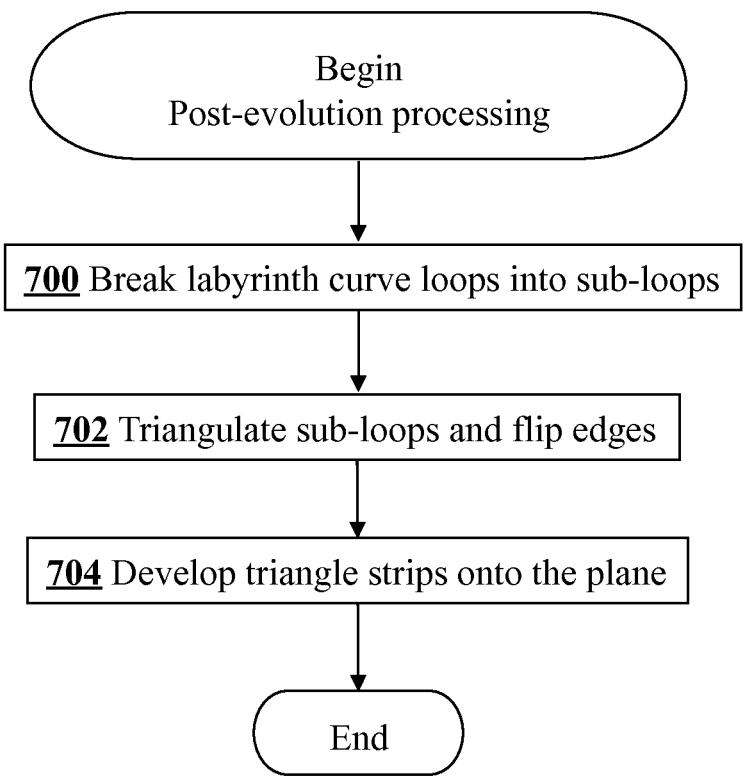
FIG. 7 is a flow chart illustrating steps of an alternate post-evolution process, according to an embodiment of the present invention.
Figure 19:
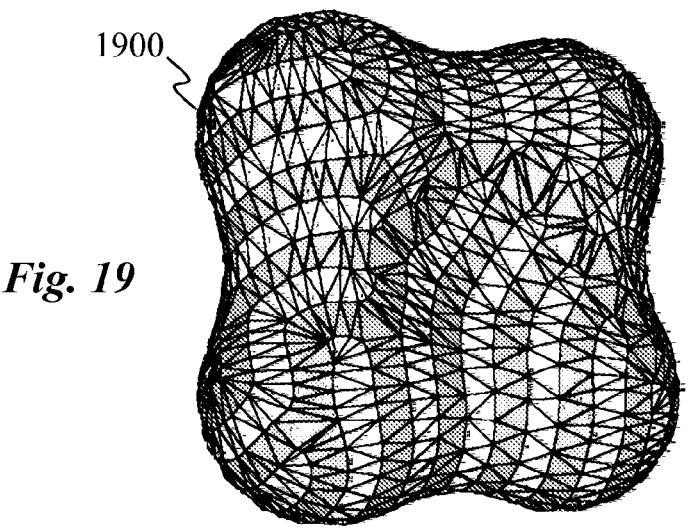
FIG. 19 is a diagram illustrating a developable surface generated by evolving a curve on a curved surface and then triangulating the resulting strips, according to an embodiment of the present invention.
Figure 20A:
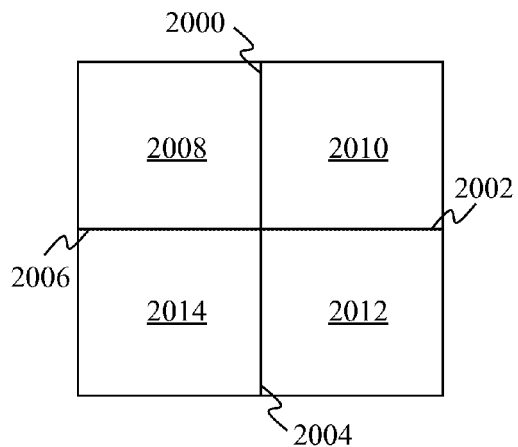
FIGS. 20A-D are diagrams illustrating four stages of a method for generating a pattern for a developable surface, according to an embodiment of the present invention.
Figure 20B:
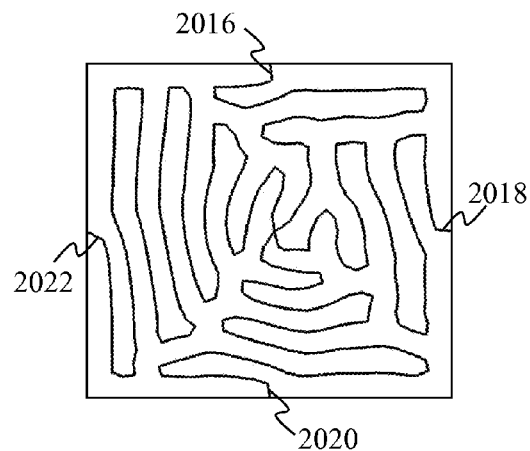
Figure 20C:
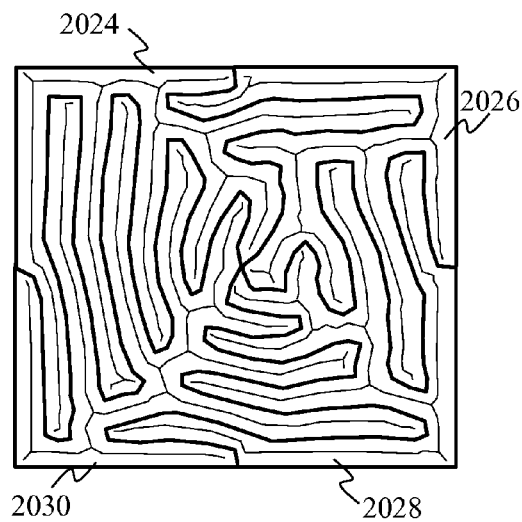
Figure 20D:
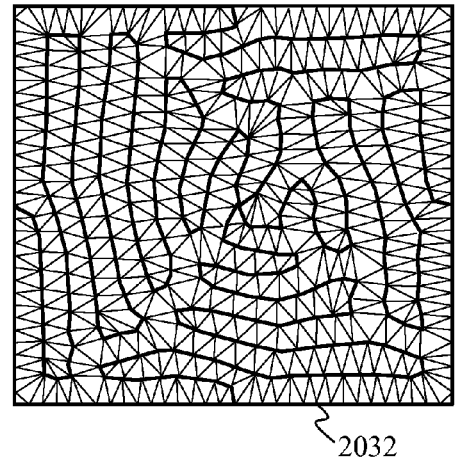

FIG. 7 is a flow chart illustrating steps of an alternate post-evolution process used for generating developable surfaces and/or patterns for making them. A developable surface is a two-dimensional surface which can be cut and unfolded onto a plane without stretching or distortion. In this case, the evolution space is typically a non-Euclidean surface containing a closed curve separating regions of the evolution space. For example, FIG. 19 is a diagram illustrating a developable surface generated by evolving a curve 1900 on a curved surface and then triangulating the resulting strips of the surface formed by the curve. The surface can be cut along the curve and the strips unfolded and laid flat on a plane, forming a pattern. The pattern can be used to cut a material which can then be folded and assembled by connecting the edges to produce a physical realization of the developable surface. FIGS. 20A-D are diagrams illustrating four stages of a method for generating a pattern for a developable surface. For simplicity of illustration, the developable surface in this case is a square. In FIG. 20A the square is shown with four initial curves drawn, dividing the square into four regions 2008, 2010, 2012, 2014. FIG. 20B shows the evolved curves 2016, 2018, 2020, 2022. FIG. 20C shows the four resulting strips 2024, 2026, 2028, 2030 corresponding to original regions 2008, 2010, 2012, 2014. FIG. 20D shows the same strips after they are triangulated with triangles such as triangle 2032.

Figures 23A, 23B, 23C:
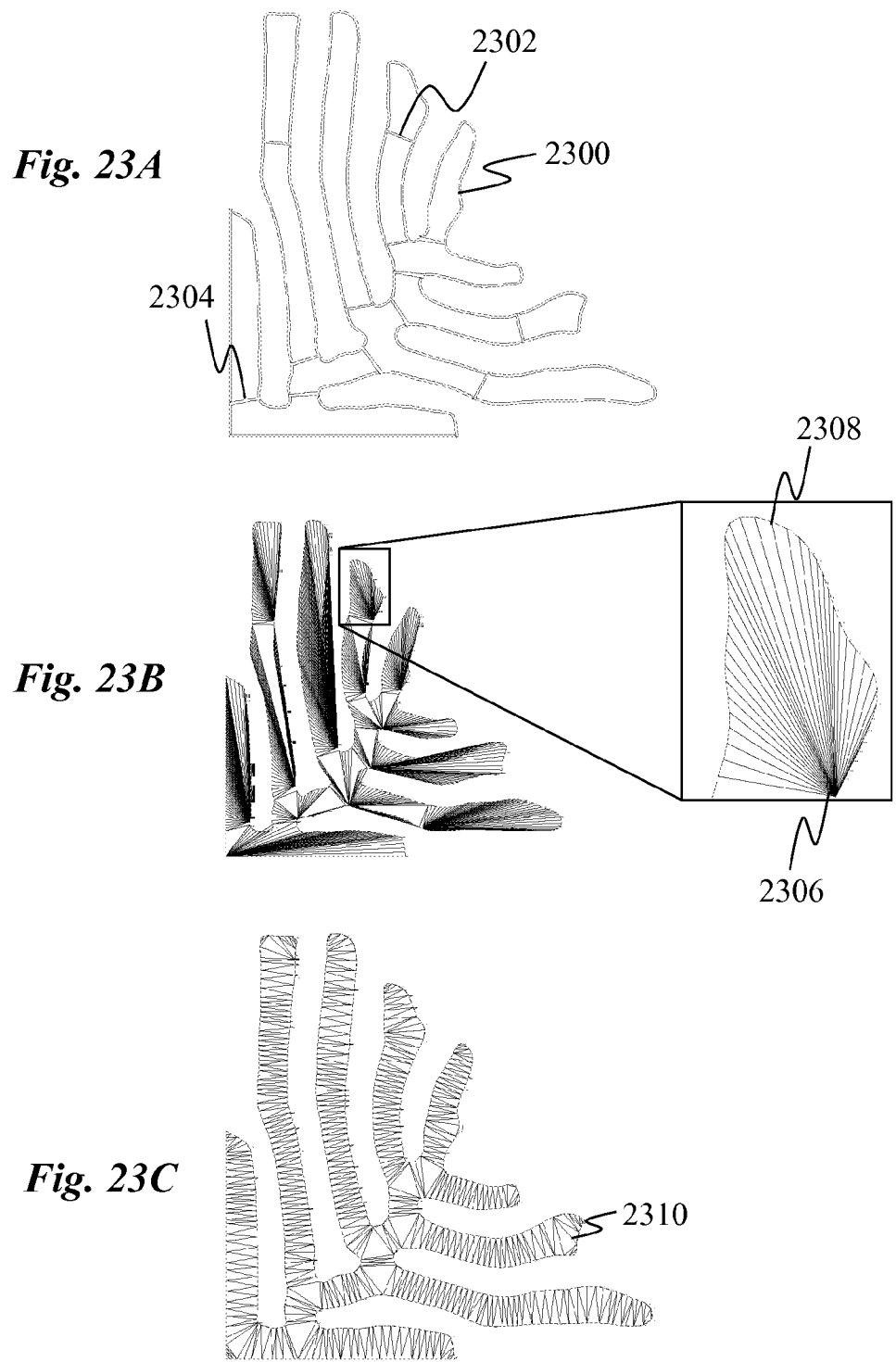
FIGS. 23A-C are diagrams illustrating the method for computing a triangulation from a curve loop.

Creating a triangulation of a general 2- or 3-dimensional concave polygon can be done in three steps. First, the curve loop is divided into a number of smaller sub-loops by automatically inserting temporary line segments along the boundary. For example, FIG. 23A shows such a loop 2300 divided by line segments 2302 and 2304 into smaller subloops. Second, each sub-loop is triangulated by forming lines between a first point 2306 on the line segment 2302 and sample points, such as 2308, along the corresponding subloop, as shown in FIG. 23B. Third, an edge-flipping optimization is used to improve the aspect ratio of the triangles. Edges are flipped repeatedly to minimize the sum of the squares of the lengths of all interior edges, such as edge 2310. FIG. 23C shows a triangulation after this process.

Typically, the developable surface is a non-Euclidean surface, in which case the triangulated strips are then projected onto a plane and cut to avoid self-intersections. FIG. 24A shows a triangle strip 2400 computed from a number of curve loops evolved on a non-Euclidean surface. Unfolding the strip 2400 on a plane produces a flat unfolded strip 2402, as shown in FIG. 24B. The unfolding may be performed by first selecting one triangle. Then, an adjacent triangle is unfolded onto the plane of the first triangle by rotating it around their shared edge. The process of unfolding is then repeated sequentially along the strips. Whenever a cycle is encountered during this process, the strip is cut along an edge. FIG. 24B shows one large cut at edge 2404; a smaller cut is shown in close-up on FIG. 24C, producing a gap between strips within the region indicated by oval 2406. The unfolding process may lead to self-intersecting triangles, as shown in the region indicated by oval 2408 of FIG. 24D. Such intersections are eliminated by breaking the strip into multiple pieces 2410 and 2412, as shown in FIG. 24E.

Figure 25A:
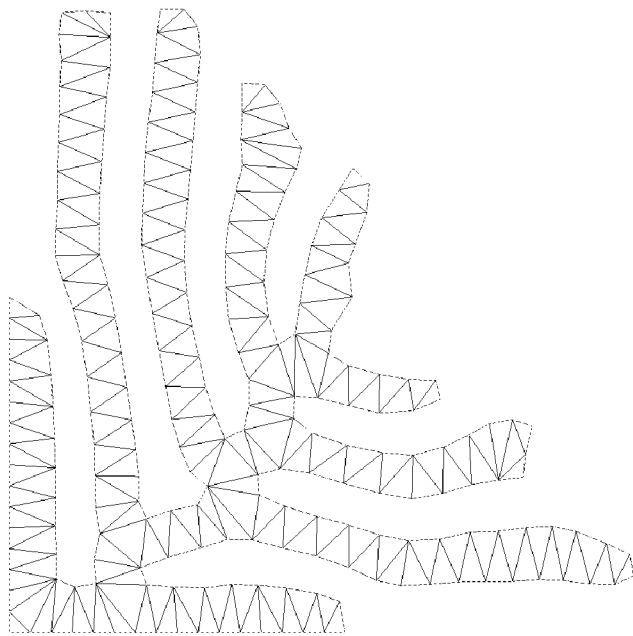
FIGS. 25A-B are diagrams illustrating post-processing of a curve loop to obtain a triangulation that is better suited for manufacturing of physical articles.
Figure 25B:
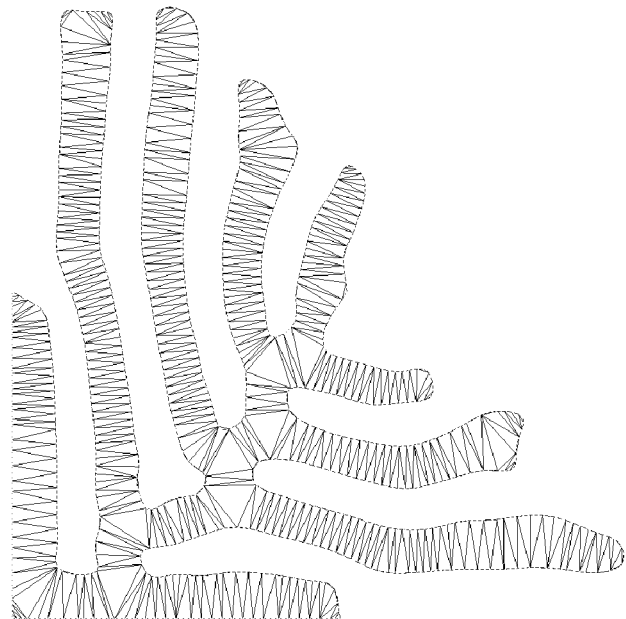

The projected strips may then be used as a pattern for generating a developable surface. Using such a pattern, an article of manufacture may be produced by cutting a material (e.g., fabric, sheet metal) using the unfolded strips as a pattern. The cut material is then bent at the triangulation lines, and edges of the resulting cut material are joined, producing a physical article resembling the original surface. Since materials like paper or sheet metal have a thickness and tension, strips cut in such materials are preferably shaped to appropriately compensate for these factors and would thus depart from being exactly like a triangle strip. The difference between the computed strips and the manufactured strips can be reduced by refining the strips by evolving the curve network with lower values of the resampling threshold parameters $k_{min}$ and $k_{max}$. FIG. 25A shows a two dimensional flattened triangulation of strips computed from a curve loop. FIG. 25B shows a flattened triangulation of the same strips computed from refined curves after lowering $k_{min}$ and $k_{max}$. For three dimensional triangle strips, the increased number of triangles means that the angle between the normal vectors of adjacent triangles is reduced. This produces strips that are easier to manufacture from stiff materials like plastic and metals.

Figure 26A:
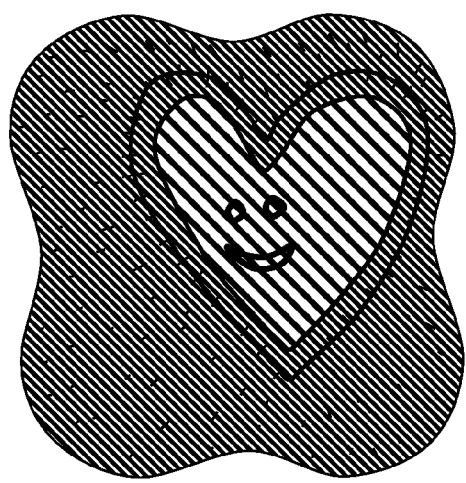
FIGS. 26A-D are diagrams illustrating curve evolution parameter functions on a three dimensional surface and stylized developable surfaces computed from curve loops evolved using the these functions.
Figure 26B:
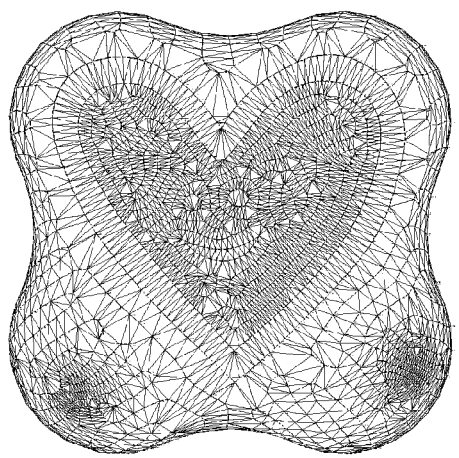
Figure 26C:
Figure 26D:
Figure 29A:
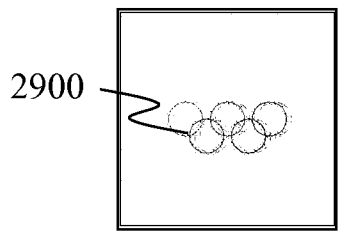
FIGS. 29A-F are diagrams that illustrate an animation where a network of circles evolve into a portrait.
Figure 29B:
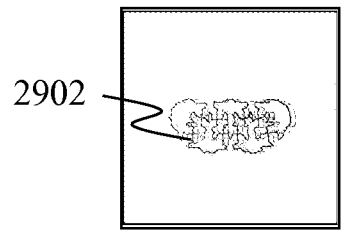
Figure 29C:
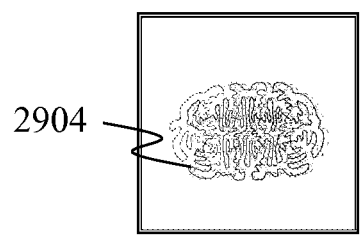
Figure 29D:
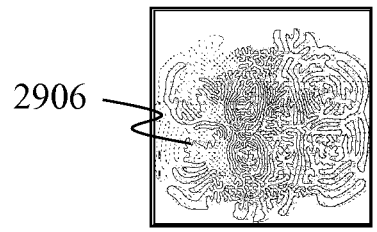
Figure 29E:
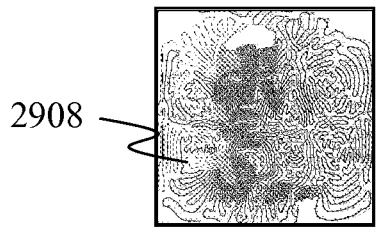
Figure 29F:
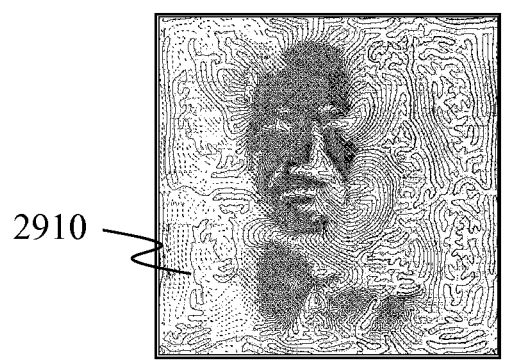

Boundary curves can be used to define regions in two dimensional surfaces. FIG. 26A shows a non-Euclidean surface with boundary curves formed by a hand drawn heart region 2600 containing two eyes and a smiling mouth. These curves divide the surface into a number of closed regions. In a preferred implementation, the regions can be selected by clicking on them. A pattern of evolution parameters can then be assigned to the selected region just like the previously discussed implementation. The selected regions are rendered in a distinct rendering style to make it clear in which region the parameters are being edited. The user can select predefined parameter settings from a predefined library. The parameter values for the selected pattern are then written to the data structure, e.g., either a (u,v) texture map or a function stored with mesh vertices. The gray shading of the surface shown in FIG. 26A represents values of an evolution parameter function (e.g., scaling function) defined on the surface. The concepts of boundary gap curves and blending also generalize directly to surfaces. A gradient vector field defined on the surface (indicated in FIG. 26A by small line segments covering the surface) is also provided as an evolution function. FIG. 26B shows a triangulation computed from loops of labyrinth curves evolved using the boundary curves and parameter functions shown in FIG. 26A. The gradient vector field was used to control the orientation of the strips in the largest region. Further, a scaling function was stored in a texture map. The scaling function was set to decrease the strip width at the two spots marked in white on FIG. 26A as well as in the interior of the heart. FIG. 26C and FIG. 26D shows different views of the final developable strips. Each triangle strip is indicated by a different shade and the boundaries between the strips correspond to the loops formed by the evolved labyrinth curves and the boundary curves shown in FIG. 26A.

Figure 35A:
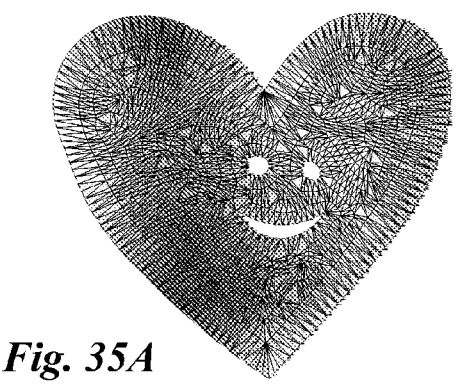
FIGS. 35A-E are diagrams illustrating how an alternative triangle strip can be obtained by triangulating the chordal axis (i.e., the set of curves that connect the mid-points of interior mesh edges) of the triangulation of the original curve loops.
Figure 35B:
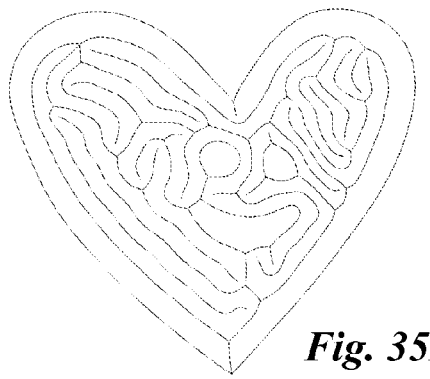
Figure 35C:
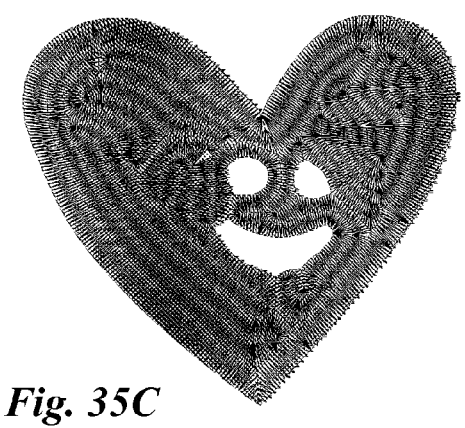
Figure 35D:
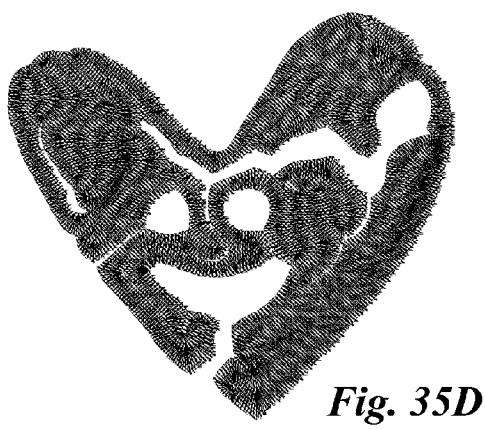
Figure 35E:
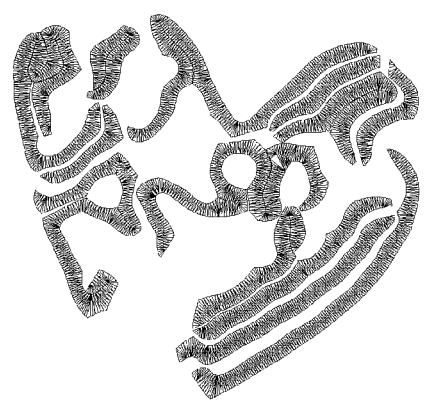

Given the triangulation of the input curve loops, there is a simple technique for creating an alternative triangle strip with a different structure. FIG. 35A shows part of the triangulation of strips from FIG. 26B. FIG. 35B shows the curves obtained by connecting the midpoints of interior edges of the triangle strips of FIG. 35A. These curves form a different set of curve loops that can be triangulated using the previously discussed technique. FIG. 35C shows the resulting triangulation. Note that it forms a single triangle strip with no branches. FIG. 35D shows the triangle strip developed into the plane. FIG. 35E shows how the triangle strip can be cut to remove self-intersections.

Although the method works even if developed triangle strips are self-intersecting, it is desirable to reduce the number of self-intersections to make it easier to join strips into physical artifacts. The lower the number of triangle strips, the easier it is to match up the strips during the assembly. The method allows the user to reduce or eliminate self-intersecting triangle strips by placing the input curves strategically so the evolving curve loops will be confined to semi-developable regions of the surface. FIG. 27 shows two triangle strips created from a single closed labyrinth curve evolved on a sphere. The curve was initially placed at the equator. Note how there are no self-intersections. The two circles 2700 and 2710 shown in FIG. 27 mark two complementary (i.e., matching) triangle strip segments. Together, the two triangle strips cover the sphere.

Figure 34A:
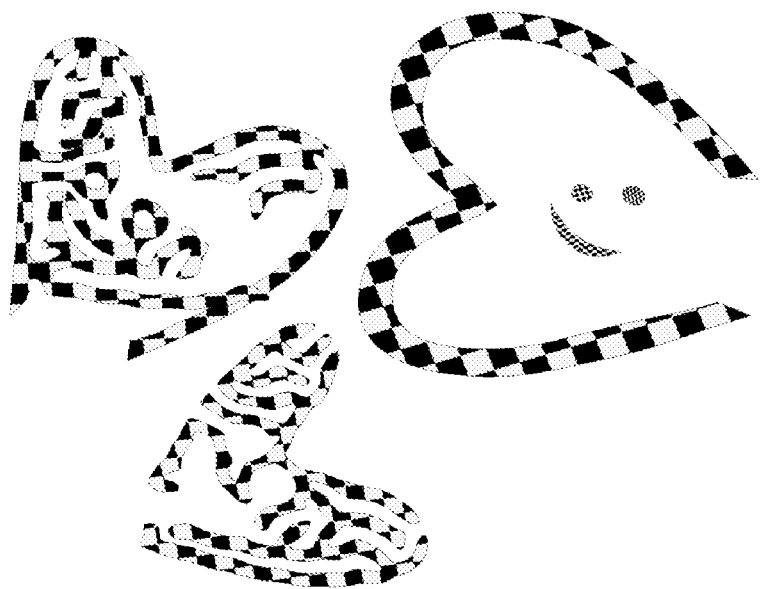
FIGS. 34A-B are diagrams illustrating how developable surfaces can be assigned a (u,v) surface parameterization and how this can be used to map image textures to the developable surface.
Figure 34B:
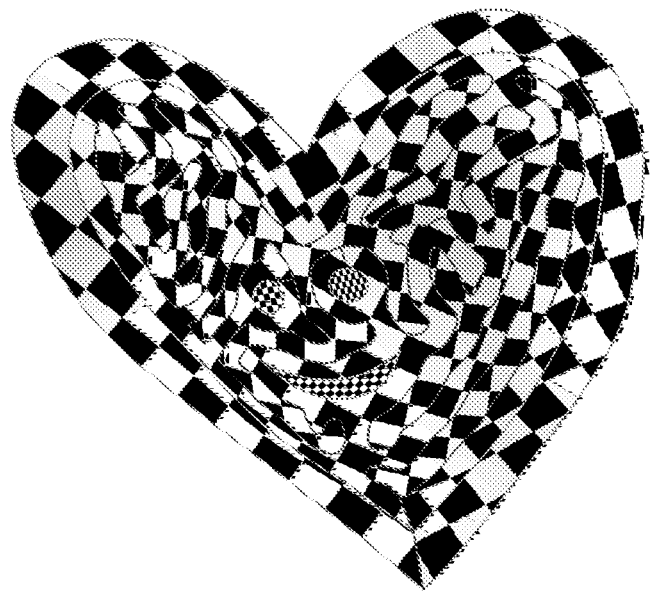

FIGS. 34A-B illustrate how triangle strips developed onto the plane can be assigned a (u,v) parameterization. The (u,v) coordinates are indicated in FIG. 34A by a separate checkerboard pattern for each triangle strip. FIG. 34B shows the same triangle strips with the texture maps mapped to the three dimensional triangulation shown in FIG. 26B. Texture maps can store any image and are widely used in the field of computer graphics to enhance the appearance of three dimensional objects.

To assemble physical articles from paper, developed triangle strips with texture maps are preferably printed on a laser printer or other color printer. Preferably, the triangle strips are scaled so that their width is at least 5 mm when printed on paper. Textures are printed on both sides of the paper with the exterior side showing a decorative pattern and the interior side a technical drawing. FIG. 28A shows the exterior side of a triangle strip with a checkerboard texture. Small tabs 2800 have been added automatically along the boundary of the strip at regular intervals. During the assembly, an adhesive may be used to attach the exterior side of each tab to the interior side of another triangle strip. On the exterior side, each tab has a printed code that identifies the triangle strip (in this case "A") and the number of the tab along that strip. Preferably, the strip would be identified by a color. The interior side of each strip has a texture map with markings indicating how the strips should be lined up during assembly. FIG. 28B-C shows examples of such markings. FIG. 28C shows a close-up of markings 2810 indicating where tabs belonging to adjacent triangle strips should be attached. In addition, the interior side clearly identifies the strips (in this case with the letter "A" although preferably a color would be used). Finally, the interior texture map shows a set of triangles to help line up the strips accurately.

For materials that other than paper, or for paper that is not compatible with printers, only the technical drawing on the interior side of the texture is printed. The material is then preferably attached to the paper with an adhesive (such as acid free paper cement) such that the printed side is visible. The strips are then cut, either by hand or with a laser cutter.

The methods described above may be implemented using commercially available hardware and software components conventionally used for computer graphics applications. For example, when implemented in OpenGL using a 2.3 GHz Pentium IV processor, the curves evolve in real time at interactive rates. Due to repeated subdivision of the curves, it may be important to defragment the sample point vector to ensure memory locality. Performance is also impacted by the use of multiple spatial modulation parameters. Consequently, it may be desirable in some implementations to provide a library of predefined high-performance parameter families for users to select from. For example, the inventors have found empirically that the following parameter ranges are stable and tend to produce interesting results:

Range $\{f_S\}$=[0.005, 0.3]
Range $\{f_R\}$=[0, 0.2]
Range $\{f_A\}$=[0, 10]
$k_0 \in [0.1, 0.3]$
$k_1 \in [1.5\, k_0, 2.5\, k_0]$
$k_{min} \approx 0.2$
$k_{max} \approx 1.2$
$\delta$ start at 1, then decrease gradually as desired.

In another application of the method, curves are evolved on a non-Euclidean surface geometry, as shown in FIGS. 36A-B. The resulting curves in three dimensional space can then be used as a model to create stylized sculptures of three dimensional objects, either manually or using automated carving or etching systems.

In the description above, embodiments of the invention involve the evaluation of a distance metric, denoted by the ∥ symbol, between either two points or a point and a line segment constrained to an evolution space. The distance metric is used to determine how a set of piecewise linear curves are updated in an iterative process. Specifically:

If the distance between adjacent points in a curve gets above a threshold, a point is inserted between them.

Points are deleted if the distance between adjacent points gets too small.

Points exert attraction-repulsion forces on each other in a local neighborhood around each point. The sign and magnitude of the forces depend on distance and the direction chosen based on the positions of the points relative to each other, i.e. in the direction of the gradient to the distance function.

Points are subjected to smoothing in order to space the points evenly along the respective curves. The spacing is measured using the distance metric.

In the case where the evolution space is a flat surface, simple Euclidean distance is a sufficient metric. The same holds when the evolution space is a 3D volume. However, the definition of distance is more complex when the evolution space is a curved surface (which is defined to include a locally piecewise flat surface that is not globally flat). Accordingly, some embodiments of the invention provide methods to define and efficiently calculate distances between two points on a curved surface and between a point and a line on a curves surface. Specifically, given a curved surface (e.g., a curved surface composed of a set of polygons), a set of parameter functions defined across the surface (most notably the scale parameter, $\delta$), and a network of point sampled curves constrained to the surface, a distance metric is provided to work with the curve evolution described in the embodiments above.

Figure 37A:
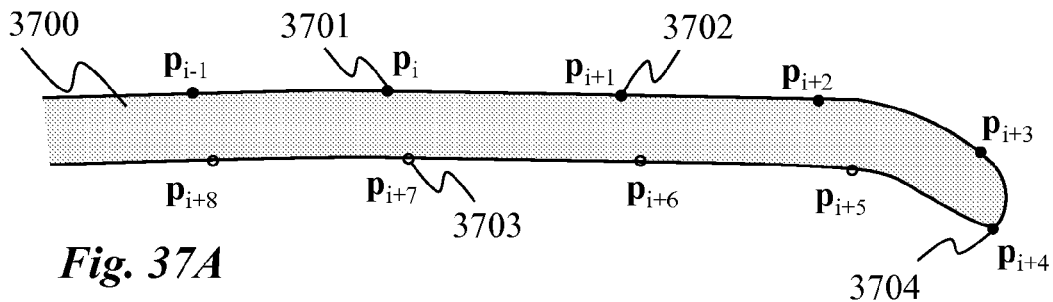
FIGS. 37A-D show cross section (37A and 37C) and side (37B and 37D) views of a 3D object with sample points forming a piecewise linear curve on the surface of it. The figure illustrates limitations of approximating the distance between two points on a surface by the Euclidean distance metric.
Figure 37B:
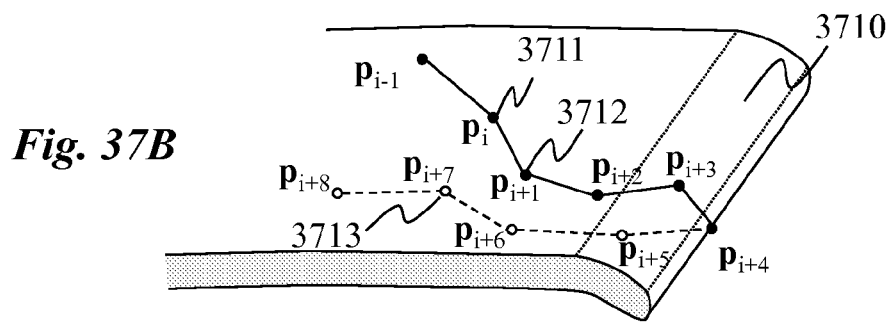

FIG. 37A shows a cross section view of a 3D object 100 shaped as a thin plate, such as a piece of bent sheet metal. FIG. 37B shows a perspective view of the same object 3710. A piecewise linear curve is comprised of a set of points on the surface, including sample points $p_i$ 3701 and $p_{i+1}$ 3702 on the upper side of the object and $p_{i+7}$ 3703 on the lower side. The line segments connecting the points can be seen in FIG. 37B, where $p_i$ 3711 is the same as $p_i$ 3701 in FIG. 37A, $p_{i+1}$ 3712 is the same as $p_{i+1}$ 3702, and $p_{i+7}$ 3713 is the same as $p_{i+7}$ 3703. The curve starts on the upper side of the object, moves around the edge 3704, and continues on the lower side. In practice, the evolution surface is approximated by a mesh comprised of triangles. The distance between any two points on a mesh can be defined in a number of ways. Two of the most popular distance metrics defined on surfaces are Euclidean distance and geodesic distance. For two points $p=(p_x, p_y, p_z)$ and $q=(q_x, q_y, q_z)$ on a surface, the Euclidean distance has the well known definition:

$$|pq|_{Euclidean}=[(p_x-q_x)^2+(p_y-q_y)^2+(p_z-q_z)^2]^{1/2}.$$

The corresponding equation for the geodesic distance is $$|pq|_{geodesic}=\Sigma_{i=1,N-1}|p_ip_{i-1}|_{Euclidean}.$$

Where the points $p_i$ are sequentially positioned along the shortest piecewise linear curve between p and q on the mesh and N is the number of points in this curve. Such a shortest piecewise linear curve on a mesh is referred to as a discrete geodesic. Note that in some cases there may be more than one discrete geodesic curve between two surface points. For example, there are an infinite number of geodesics between the north and south poles on a sphere.

Figure 37C:
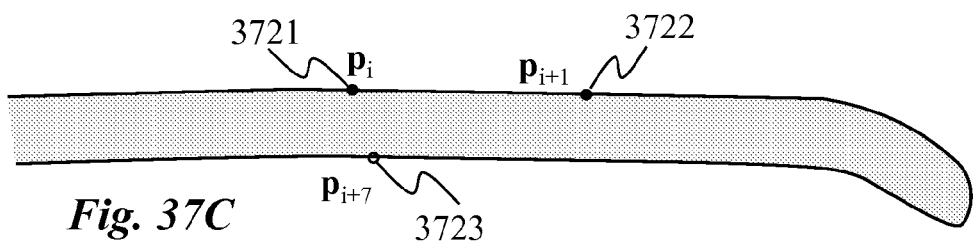
Figure 37D:
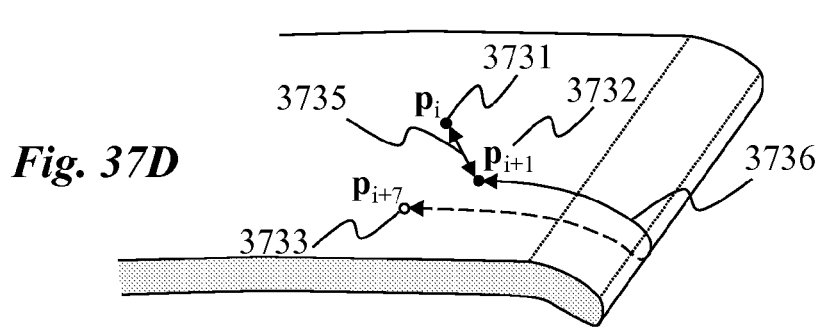
Figure 40A:
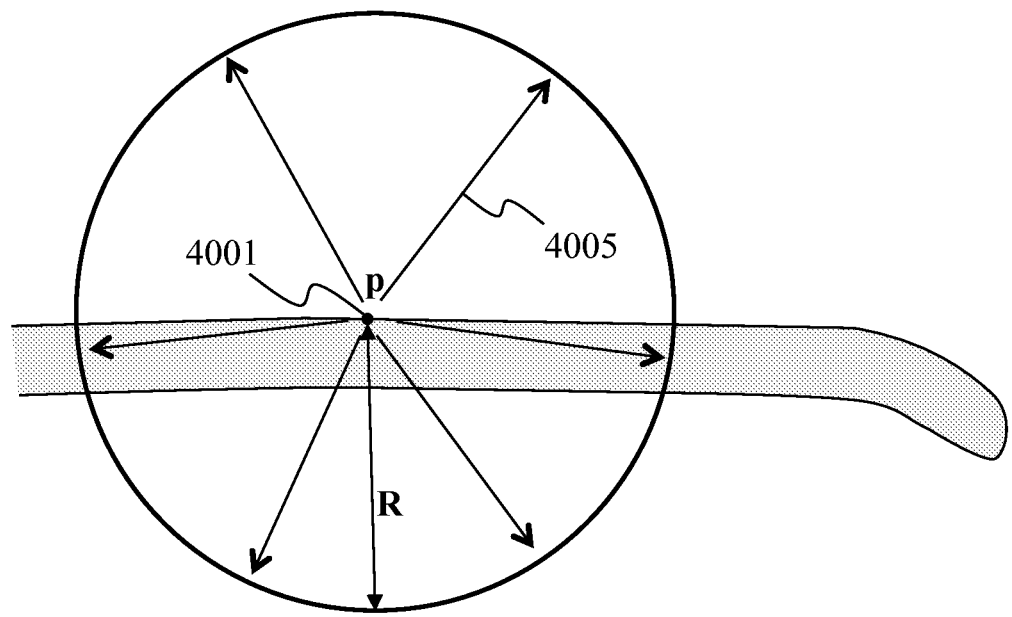
FIG. 40A-B.
Figure 40B:
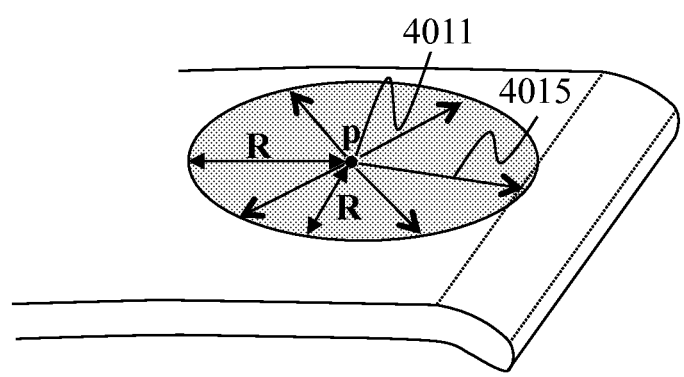

FIGS. 37C and 37D are simplified versions of FIGS. 37A and 37B that focus on three sample points on the surface: $p_i$ 3721 and $p_{i+1}$ 3722 on the upper side and $p_{i+7}$ 3723 on the lower side. Since the surface is flat in the neighborhood of the first two points, the Euclidean distance, $|p_ip_{i+1}|_{Euclidean}$, is a good estimate of the length of the geodesic between them 3735, $|p_ip_{i+1}|_{geodesic}$. On the other hand, although $p_i$ 3731 and $p_{i+7}$ 3733 are near each other measured by Euclidean distance, $|p_ip_{i+7}|_{Euclidean}$, which is not constrained to the surface of the mesh, the geodesic between them 3736, $|p_ip_{i+7}|_{geodesic}$, is much longer. Also note that the gradient vector field to the distance function may point in entirely different directions depending on the choice of metric. FIG. 40A illustrates the gradient vector field to the Euclidean distance relative to a point p 4001 on a surface, which contains vectors that point away from the surface. In contrast, FIG. 40B shows the gradient vector field to the geodesic distance relative to a point p 4011 on the surface, which contains vectors constrained to the surface. In general, the gradient to the geodesic distance is always a vector in the tangent plane to the surface.

The calculation of Euclidean distances is far simpler and computationally less intensive than the calculation of geodesic distances. It is only in the last decade that it has become feasible to calculate geodesic distances on meshes, and the use of the geodesic metric has been limited to the cases that only involve queries of distances to a limited number of points or piecewise linear curves on the mesh. The ability to feasibly evaluate tens to hundreds of millions of geodesic distances between arbitrary points on a mesh of arbitrary size remains an open problem in computational geometry.

Figure 38:
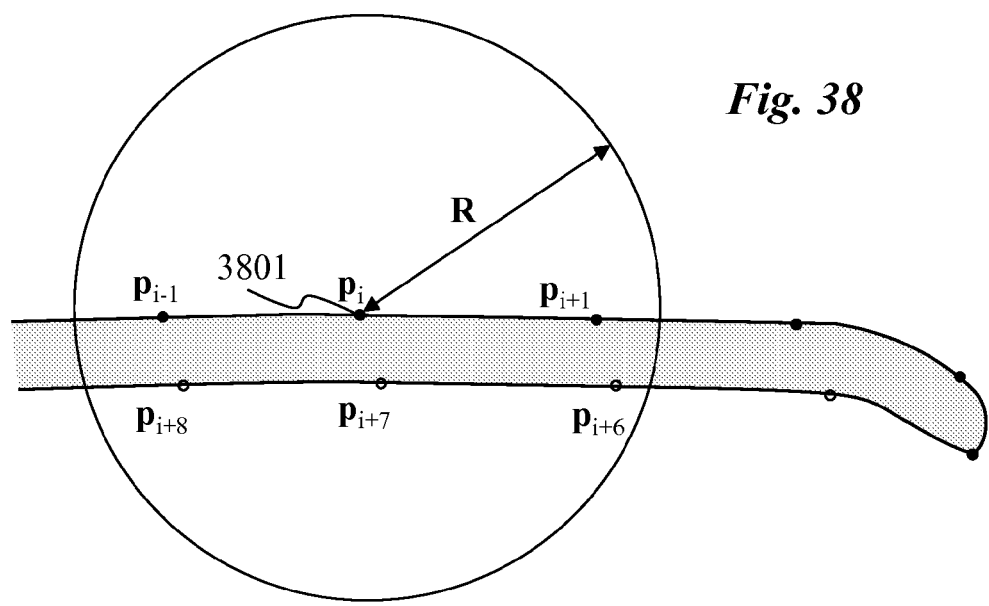
FIG. 38 shows a cross section view of a 3D object with points on its surface. A sphere with radius R is centered in one of the points and contains points on both the upper and lower side of the 3D object.
Figure 39A:
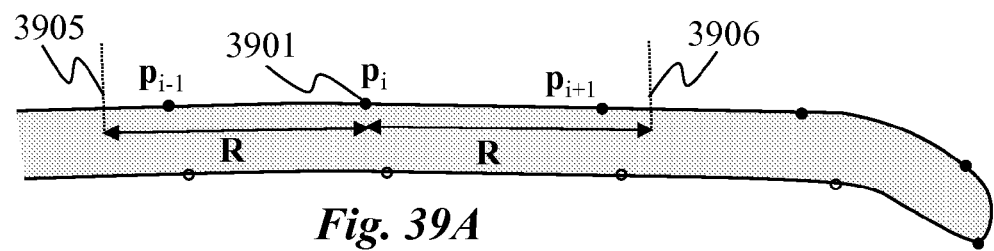
FIG. 39A-B show two views the same 3D object depicted in FIG. 38 with a surface region surrounding a point indicated. The region is defined as all the points for which the shortest surface path to the center point is less than R. The region only contains points on the upper side of the 3D object.
Figure 39B:
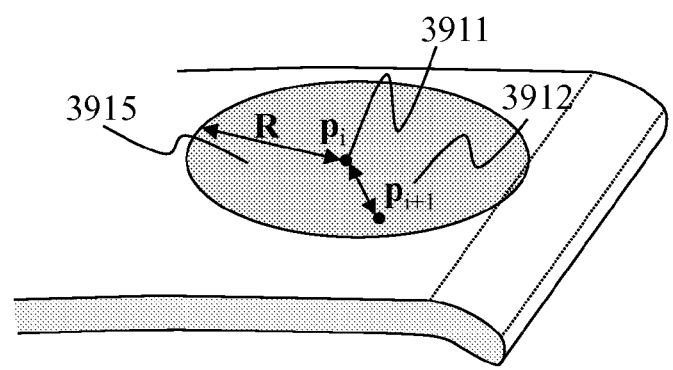

Since this discussion is aimed at the case where the evolution space for the curves is an infinitely thin surface, sample points should be able to sense and affect each other in a 2D neighborhood on the surface, but points outside this neighborhood should ignore each other, no matter how close the 3D Euclidean distance between them might be. Therefore, the distance between two points on a surface may be defined as the length of the discrete geodesic between them. FIG. 38 shows a cross section view of a point $p_i$ on a 3D surface 3801. Other points on the surface for which the Euclidean distance to $p_i$ is less than R are shown. Note that both points on the upper and lower side of the surface are included in this set, which is essentially the subset of points that fall inside a sphere centered at $p_i$ with radius R. FIG. 39A shows the same surface shown in FIG. 38 with a point $p_i$ 3901 equivalent to 3801 in FIG. 38. Here, the subset of surface points for which the shortest geodesic distance to $p_i$ is less than R is indicated by the lines 3905 and 3906. In contrast to the Euclidean distance metric (FIG. 38A), only the two points $p_{i-1}$ and $p_{i+1}$ on the upper part of the surface are considered within a distance of R by the geodesic distance metric. FIG. 39B shows a different view of the surface shown in FIG. 39A. The point $p_i$ 3911 corresponds to 3901 in FIG. 39A. The nearby point $p_{i+1}$ 3912 falls inside the shaded region 3915 of surface points that are closer than R measured by the geodesic metric.

The curve evolution technique used in embodiments of the present invention takes place in an iterative process in which piecewise linear curves have sample points deleted, inserted, and moved. The curves may contain hundreds of thousands to millions of sample points; and the evolution mesh, which the sample points are constrained to, may comprise tens of millions of vertices and faces. The evolution may take place over tens of thousands of iterations. Since there is no known solution to calculating geodesic distances between arbitrary points on a large mesh, the following observations are made to simplify the problem:

1. In every query of the geodesic distance between two points on the mesh, the maximum query distance is bounded by either the maximum attraction-repulsion radius, $R_1$, or the distance between points for which the shortest connecting path along any curves have no more than k points, where k usually is 2 or 3 (i.e., the number of adjacent points considered in smoothing or attraction-repulsion). Since a line segment between adjacent points is split if its length exceeds a threshold, $d_{max}$, the maximum distance that can result from any evaluation of the geodesic distance metric is $\max(k \cdot d_{max}, R_1)$. This number is known a priori, before the curve evolution starts.
2. The exact geodesic distance is not needed. The end goal of the curve evolution is to produce a curve network that forms suitable boundaries for developable surfaces spanning the mesh. An approximation to geodesic distances that meets this goal is sufficient.

The first observation means that surface distances greater than a fixed number never have to be evaluated. Therefore, it is possible to pre-compute geodesic distances between vertices within a limited neighborhood of each vertex on the mesh and store these distances in a table. The distance between two vertices can then be evaluated in constant time during the curve evolution by simple lookup of the stored values in the table. It is noted that the table could also store distances from other primitives within a limited neighborhood, such as distances from line segments or from mid-points on edges or faces; but for simplicity it will assumed that the mesh has been refined using grid generation techniques that are standard for improving numerical accuracy in fluid dynamics and other scientific areas. Preferably, the mesh elements, usually triangles, have a regular structure, such that all triangle angles are less than 90 degrees and have bounded aspect ratios, for example.

The second observation allows distances to be approximated by interpolation from the cached table of vertex-to-vertex distances. Henceforth, the notation $|pq|_{surface}$ and the term surface distance will refer to any such approximation to the geodesic distance between two points p and q on a mesh.

Figures 47, 48:
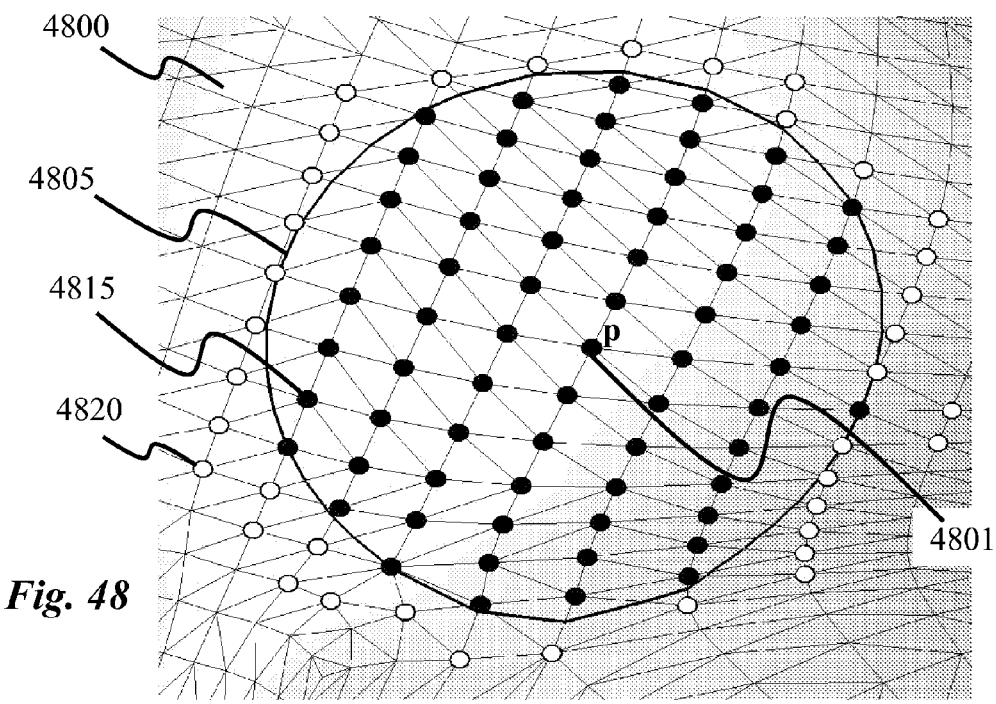
FIG. 47 shows the structure of the vertex-to-vertex distance table.
FIG. 48 shows the extent of the neighborhood around a given vertex that must be sampled in the vertex-to-vertex distance table.

FIG. 47 shows the structure of the table of vertex-to-vertex distances. For each vertex in the mesh, a list of indices to vertices within the maximum surface distance is stored along with the corresponding surface distances to these vertices. FIG. 48 shows part of a mesh 4800 and one of its vertices p 4801. The part of the mesh that lies within the maximum query distance is illustrated by a closed curve 4810 representing the iso-contour for maximum query distance. The vertices for which the distance to p is less than the maximum query distance is are shown as black, e.g., vertex 4815. The distances from p to these vertices are stored in the vertex-to-vertex distance look-up table. In addition, all vertices on triangles with at least one corner vertex closer than the maximum query distance to p must be included in the vertex-to-vertex distance look-up table. Although the distance to the latter vertices, indicated by circles 4820 in FIG. 48, may be greater than the maximum query distance, the samples will be needed to estimate the distance for points on triangles that straddle the iso-contour of the maximum query distance 4805.

As with any metric, the distances in the vertex-to-vertex distance table are symmetric, i.e., $|pq|_{surface}=|qp|_{surface}$. Since the surface distances are calculated using numerical techniques that inevitably introduce inaccuracies, the distance to q that is calculated when creating the vertex-to-vertex distance table entry for p may be different from the distance calculated the other way. If $|pq|'_{surface}$ surface and $|qp|'_{surface}$ denote the two surface distances calculated during the initial creation of the vertex-to-vertex distance look-up table, their average is stored as the symmetric distance for both of them, i.e., $$|pq|_{surface}=|qp|_{surface}=(|pq|'_{surface}+|qp|'_{surface})/2.$$

Figure 46:
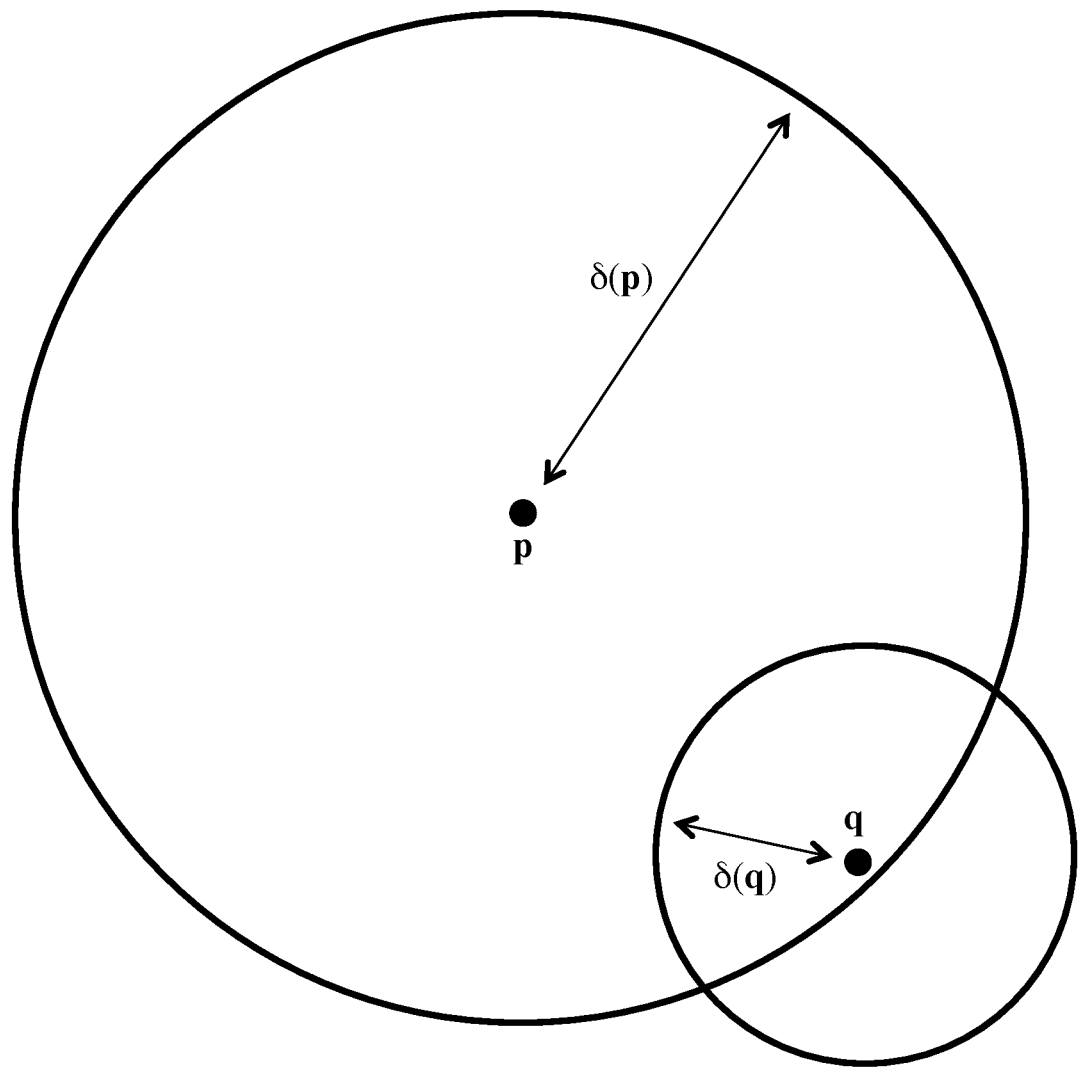
FIG. 46 shows two points with different attraction-repulsion radius.

Embodiments of the invention, as previously described, include a spatially varying scale function δ defined on the evolution space. This scalar function scales the evolving curve network, allowing more detail in some regions than others. When the evolution space is a surface, the scale function allows the curve network to adapt so that more detail is added in high curvature regions and/or near geometric features than in flat areas with no discernable features. One implication of the scale function is that the radius of influence varies across the surface. FIG. 46 shows two points p and q where $δ(p)>δ(q)$. The attraction and repulsion forces, which points exert on each other, are symmetric, i.e., the magnitude of the force that p exerts on q is the same as the magnitude of the force that q exerts on p. During the calculation of the vertex-to-vertex distance table, care must be taken to ensure that if vertex q is included in the entry of neighbors for vertex p, p is also included in the entry for q. In a preferred embodiment, only the neighbors necessary to satisfy these conditions are stored for each vertex. When creating the vertex-to-vertex distance table, the vertices are first sorted based on the scale function δ(p). The vertices are processed in descending order, starting with those corresponding to the largest distance thresholds. Prior to calculating the distances for a vertex q, a check is done to see if q occurs in the neighborhood of any previously processed vertices. If this is the case, the distance calculation continues until distances to all the latter vertices have been calculated. Referring to FIG. 46, vertex p, which has the larger distance threshold, is processed first and vertex q recorded among its neighbors. Later, when q is processed, the inclusion of vertex p is added to the termination criterion for the propagation of distances emanating from q.

Before explaining how the vertex-to-vertex distance tables can be used to estimate distances between points located in the interior of mesh faces, we will briefly refer to two existing methods for calculating distances between two vertices on a mesh: discrete geodesic distances and discrete exponential maps. In a preferred embodiment, several different distance metrics can be used interchangeably to estimate the distance between two vertices. The vertex-to-vertex distance table takes time calculate as well as memory and disk space so there is a trade-off involved between accuracy and computational cost. Using Euclidean distances in large, flat areas of the surface may be sufficient while surface distances can be used in areas where Euclidean distances are insufficient (see FIG. 37A-D, FIG. 45A-B). Discrete geodesic distances on a mesh are calculated by propagating information from an initial source, which can be a vertex, line segment, or piecewise linear curve on the mesh. Currently used techniques represent an evolution of a theoretical method described in "The Discrete Geodesic Problem", J. S. B. Mitchell, et al., Siam Journal of Computing, Vol. 16 Issue 4, August 1987. It is only in the last decade that the algorithmic complexity of Michell's method has been reduced sufficiently to make the calculation practical for larger meshes. Those skilled in the art will be familiar with such techniques, as described for example in the survey article "Fast Exact and Approximate Geodesics on Meshes", V. Surazhsky et al., ACM Transactions on Graphics—Proceedings of ACM SIGGRAPH 2005, Vol. 24 Issue 3, July 2005. In this technique, a priority queue is used to sort a set of windows, which are essentially edge segments along which the geodesic distance forms a linear function. The algorithm repeatedly picks the window closest to the source and adds new windows in adjacent triangles to the priority queue. Eventually, the propagation is stopped when a given termination criteria is met or when every part of the mesh has been visited. The resulting discrete geodesic distances represent one example of distance metric that can be used to define surface distances in an embodiment of the present invention.

A completely different example of surface distance calculation that can be utilized in an embodiment of the present invention is discrete exponential maps. Discrete exponential maps are related to the large body of literature on mesh parameterization that has been done in Computer Graphics research. See, for example, "Interactive Decal Compositing with Discrete Exponential Maps", R. Schmidt et al., ACM Transactions on Graphics—Proceedings of ACM SIGGRAPH 2006, Vol. 25 Issue 3, July 2006. However, the discrete exponential maps approach has been designed for parameterizing a local neighborhood near a given point on the mesh and provides a good distance metric for our purposes. The approach in Surazhsky et al. first uses Dijkstra's shortest path algorithm to calculate the shortest path of mesh vertices between the source vertex p and each vertex in its neighborhood. This piecewise linear path is then "lifted" to the tangent plane at p by rotating each line segment to the tangent plane at p. The geodesic distance estimate is the Euclidean distance between p and the resulting points in the tangent plane at p. The details are described in Schmidt et al. It is noted that discrete exponential maps are more forgiving in terms of irregular meshes than the discrete geodesic distance approach.

A third example of distance metrics for surfaces is simply to use Euclidean distances. As pointed out earlier, Euclidean distances have limitations in terms of measuring surface distance accurately, but they can be computed quickly and may be a sufficient approximation in flat areas of a surface.

It is emphasized that the present invention is not limited to a any single definition of surface distance. The invention assumes that some algorithm, possibly slow or excessively memory consuming, exist for somehow calculating the distance from one surface point to another. The contribution of the present invention is to sample the distance functions appropriately across the surface in order to allow distances between general points to be estimated quickly by interpolation.

The vertex-to-vertex distance look-up table can be used directly to estimate distances between two vertices. The following description will address the case where one or both points lie in the interior of a triangle or on an edge. For simplicity, it is assumed that a path between the two points exist on the mesh, i.e., that the points do not lie on disconnected mesh components. The latter case is not of interest in terms of our goal of creating developable surface approximations to meshes.

Figure 41A:
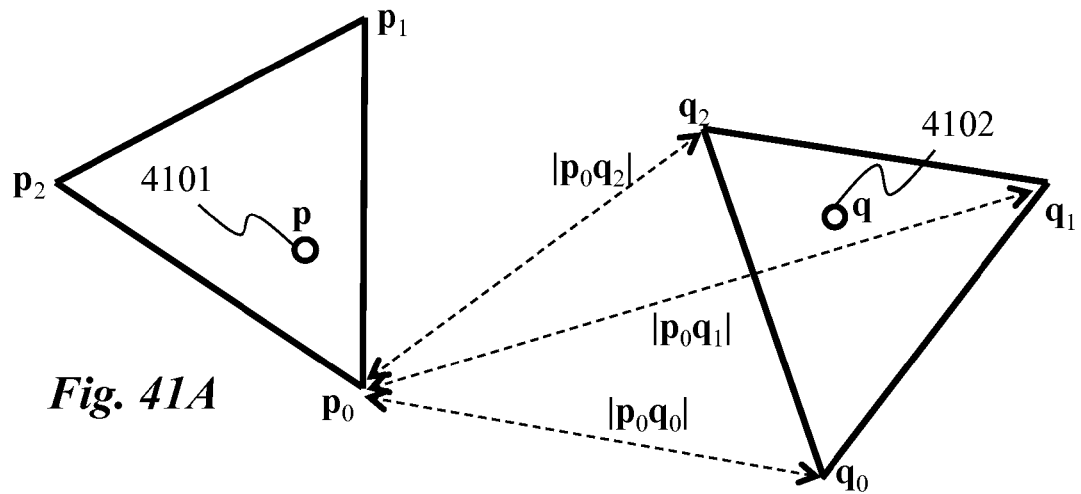
FIG. 41A-C show the various distances between pairs of vertices that are used to interpolate the surface distance between two arbitrary points p and q on a mesh.
Figure 41B:
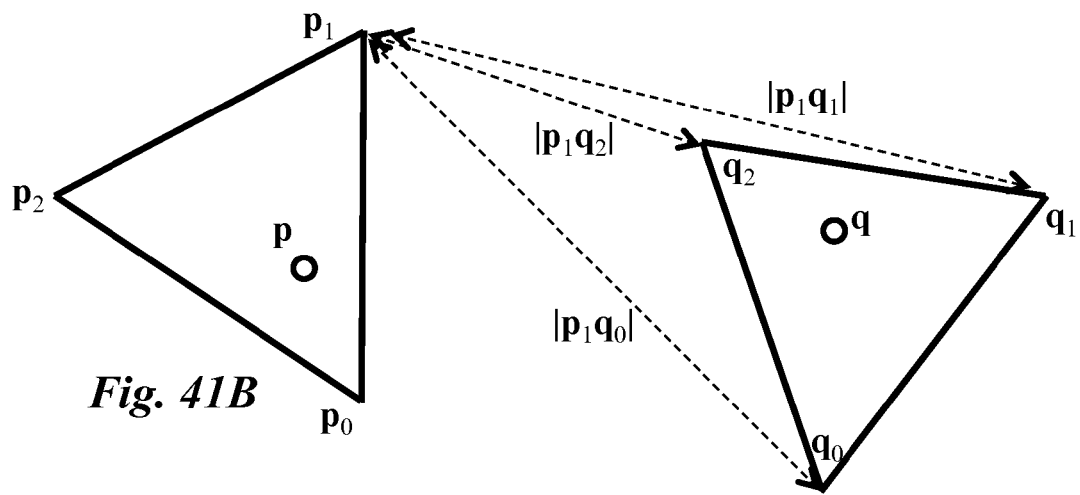
Figure 41C:
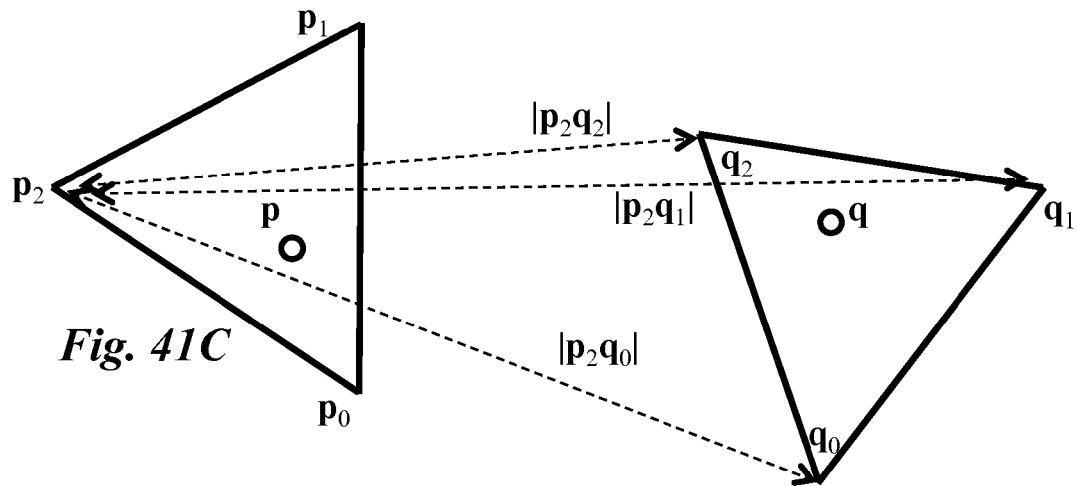

FIG. 41A shows two points p 4101 on triangle $\Delta p_0 p_1 p_2$ and q 4102 on triangle $\Delta q_0 q_1 q_2$. To estimate the surface distance $|pq|_{surface}$, the first step is to calculate the barycentric coordinates of the two points relative to the triangle they lie on. The barycentric coordinates (a,b,c) of a point on a triangle are the coefficients of a linear combination $$p = ap_0 + bp_1 + cp_2, \text{ where } a,b,c \geq 0 \text{ and } a+b+c = 1.$$

Given the barycentric coordinates of p and q, i.e., $(a_p, b_p, c_p)$ and $(a_q, b_q, c_q)$, the next step in the distance evaluation is to estimate the distances from q to each of the three corners of the triangle that p lies on:

$$|p_0 q|_{surface} = a_q |p_0 q_0|_{surface} + b_q |p_0 q_1|_{surface} + c_q |p_0 q_2|_{surface},$$

$$|p_1 q|_{surface} = a_q |p_1 q_0|_{surface} + b_q |p_1 q_1|_{surface} + c_q |p_1 q_2|_{surface},$$

$$|p_2 q|_{surface} = a_q |p_2 q_0|_{surface} + b_q |p_2 q_1|_{surface} + c_q |p_2 q_2|_{surface}.$$

All of the distances on the right side of these equations, which are illustrated in FIGS. 41A-5C, are stored in the pre-computed vertex distance look-up table. The final distance can now be estimated $$|pq|_{surface} = + a_p |p_0 q|_{surface} + b_p |p_1 q|_{surface} + c_p |p_2 q|_{surface}.$$

Figure 42A:
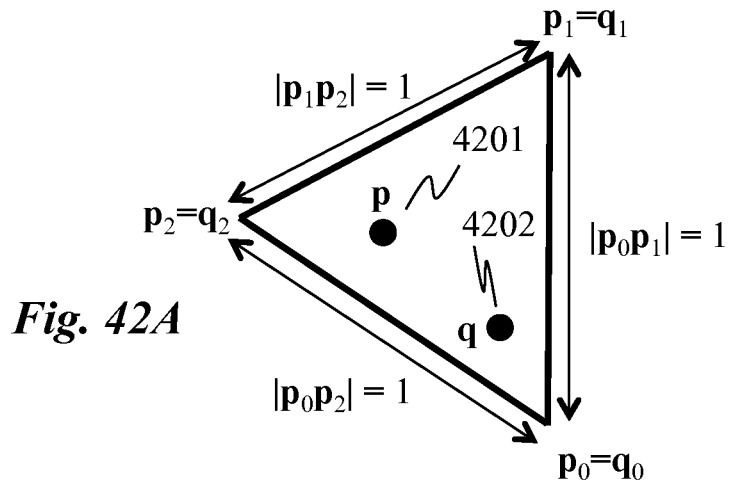
FIG. 42A-B show cases where the equations for estimating surface distances by interpolating distances between pairs of vertices are insufficient.
Figure 42B:
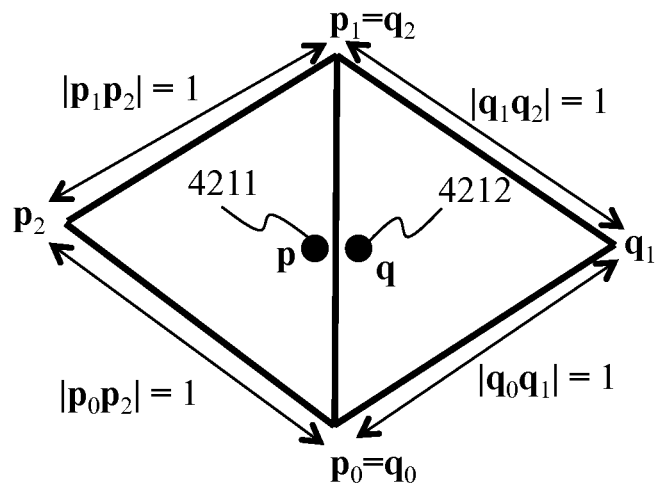

This approximation is sufficient for our purposes if the shortest path between p and q passes through several triangles. Some inadequacies arise, however, if the two points lie on the same or on incident faces. FIG. 42A shows the points p 4201 and q 4202 on the same equilateral triangle $\Delta p_0 p_1 p_2 = \Delta q_0 q_1 q_2$ with side length 1. Since all distances between vertices are 1, all the distance table look-ups in the above equations have the result 1 so $|pq|_{surface} = 1$ no matter where on the triangle the points are located. FIG. 42B shows a similar case where points p 4211 and q 4212 are positioned very close to each other on opposite sides of equilateral triangles $\Delta p_0 p_1 p_2$ and $\Delta q_0 q_1 q_2$. Again, for all vertex distances, $|p_i q_j|_{surface} \geq 1$, where $1 \leq i,j \leq 3$, so $|pq|_{surface} \geq 1$ no matter how close p 4211 and q 4212 actually are to each other. These inadequacies are addressed by checking whether triangles $\Delta p_0 p_1 p_2$ and $\Delta q_0 q_1 q_2$ are identical or share an edge. If this is the case, the shortest distance is calculated directly instead using elementary trigonometry. Since it was assumed that the mesh is comprised of regular triangles with homogeneous angles and aspect ratios (the scale of the triangles may vary), the shortest path between p and q will usually cross at most one mesh edge, although it is possible for the path to have multiple edge crossings in rare cases. Note that the region for which the distance is computed directly rather than by interpolation from the vertex-to-vertex distance table is not restricted to be the four triangles indicated in FIG. 43A smaller or larger region around the triangle corresponding to q can be used analogous to the approach described above.

Figure 43:
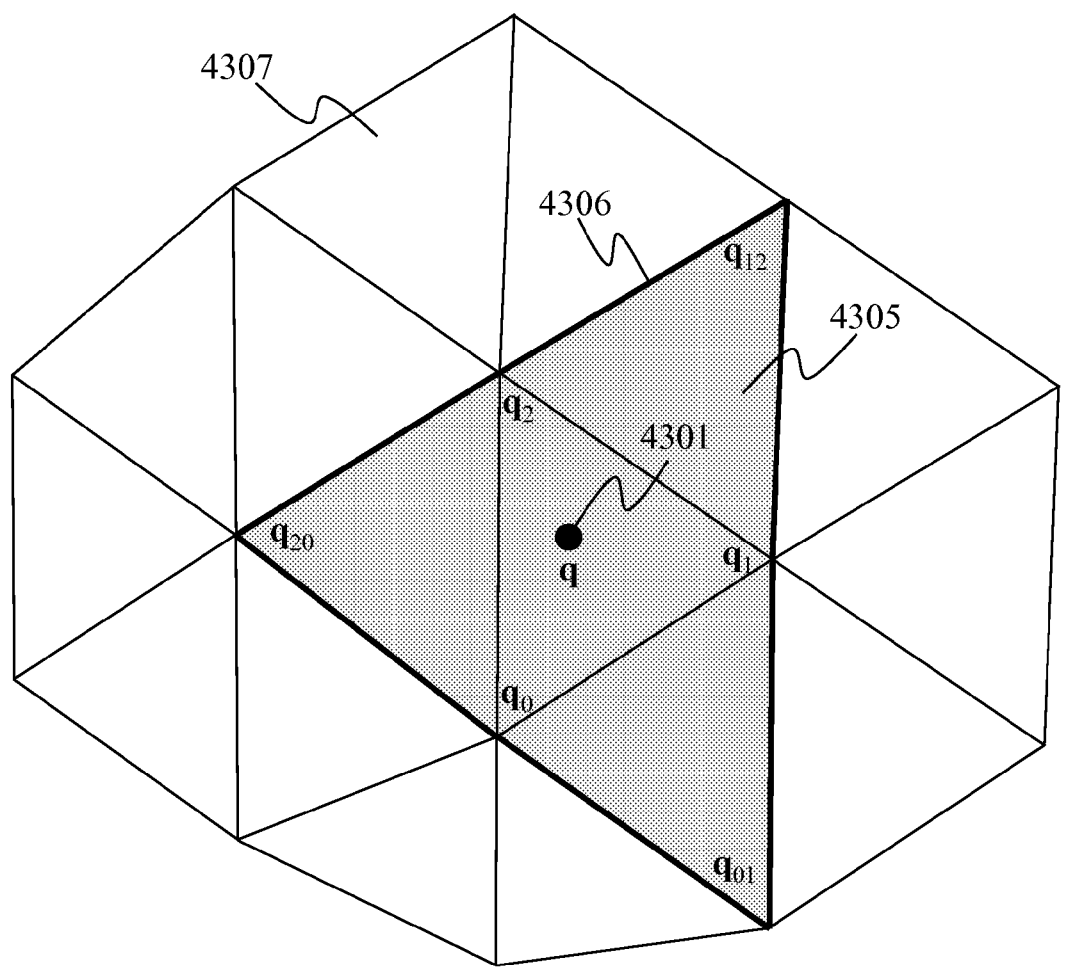
FIG. 43 shows a point q on a triangle and the regions where distances to q are calculated directly and where they are calculated by interpolating vertex-to-vertex distances.

The distances are now accurate, but the distance function is no longer continuous. FIG. 43 shows the point q 4301 on the triangle $\Delta q_0 q_1 q_2$ with adjacent triangles $\Delta q_0 q_1 q_{01}$, $\Delta q_1 q_2 q_{12}$, and $\Delta q_2 q_0 q_{20}$. The four triangles for which the surface distance $|pq|_{surface}$ is calculated directly are indicated by the shaded area 4305. For p belonging to other triangles, the barycentric interpolation formula is used. This leads to an abrupt jump in the distance function on the border between the two areas 4306. This problem can be overcome by modifying the three above barycentric equations:

$$|p_i q|_{surface} = a_q |p_i q_0|_{surface} + b_q |p_i q_1|_{surface} + c_q |p_i q_2|_{surface}.$$

If $p_i$ is not in the set $\{q_0, q_1, q_2, q_{01}, q_{12}, q_{20}\}$, the equation is unchanged. Otherwise, $|p_i q|_{surface}$ is calculated directly like any other point in the four shaded triangles 4305 in FIG. 43. With this modification, the distance function becomes continuous.

FIG. 44 shows a mesh 4400 that has a point 4401 positioned on a triangle. The iso-contour lines 4405, 4406, 4407 corresponding to different distances to the point are visualized. The linear interpolation of distances ensures that the distance metric is a continuous function. However, the gradient to the distance function will not be continuous unless a higher order interpolation is used in the interpolation of distances. The direction of the gradient is important for determining the direction in which points are attracting or repelling each other. The attraction-repulsion serves to attract or repel points relative to each other so the force vectors must point in the direction where the distance between the points changes most rapidly. For surface distances, this direction is usually tangential to the shortest geodesic path between the points, except in the case where multiple shortest geodesic paths exist.

In a preferred embodiment, the gradient is sampled at each vertex and interpolated using exactly the same interpolation approach that is employed for estimating distances. The gradient vector field can be seen as three different scalar functions corresponding to the x, y, and z components. Since the gradient vectors can be stored in the vertex-to-vertex distance table along with vertex distances, interpolating gradients works exactly like interpolating distances. The main difference is that the interpolated gradient vector is normalized afterwards since the magnitude of the gradient to a distance function always should have a value of 1. While the resulting vector field is not the exact gradient field to the surface distance, it is continuous and a sufficiently good approximation for the purpose of calculating attraction-repulsion forces. In FIG. 44, the gradient to the distance function is shown as a vector field 4410. To estimate the gradient at a vertex p, a weighted average of gradients estimated from the distances corresponding to every incident triangle may be used. For each triangle incident to p, the direction of the gradient is estimated using finite differences. The resulting vector is normalized since the magnitude to the gradient of a distance function always has a value of 1, and it is weighted by the angle between the two edges of the triangle that are connected to p. The sum of the resulting vectors is calculated, normalized, and cached as the approximation to the gradient at vertex p.

Figure 49A:
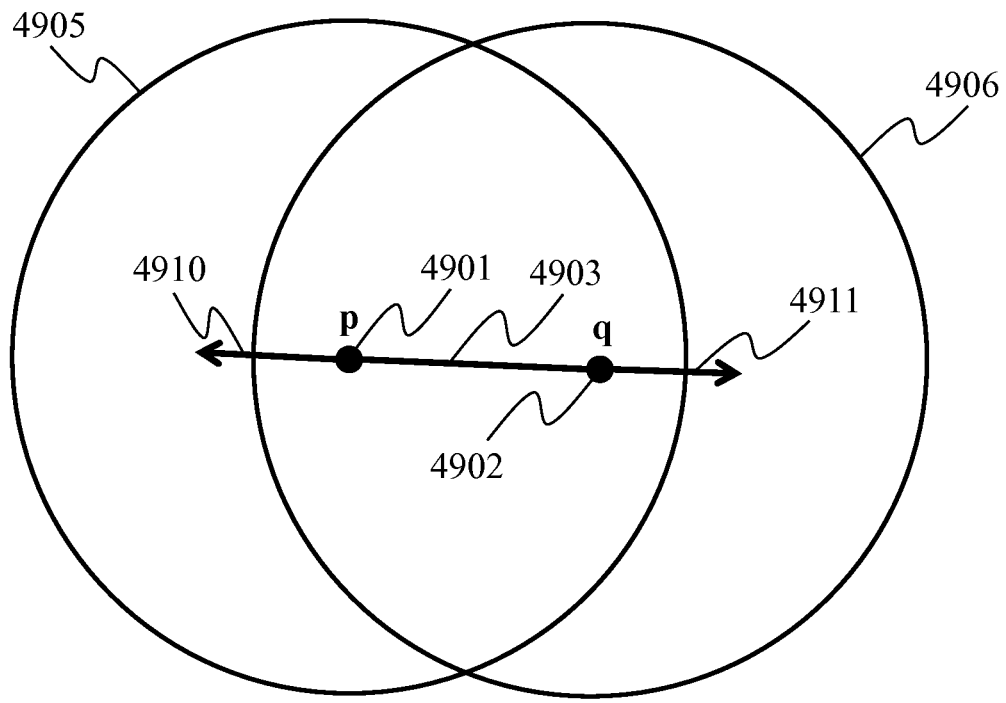
FIG. 49A-B shows differences between the directions of gradient vectors when using Euclidean distance (49A) and surface distance (49B).
Figure 49B:
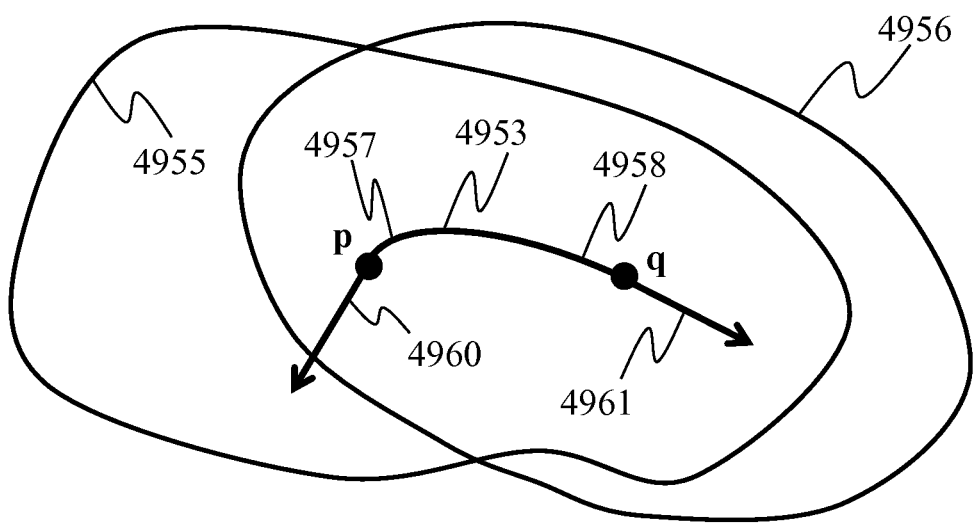

When calculating attraction-repulsion forces between two points p and q on a mesh based on Euclidean distance, the force that p exerts on q is identical to the force q exerts on p but with the opposite sign. When using surface distance, the magnitudes of the two forces will be the same but the directions generally will not. FIG. 49A shows two points p 4901 and q 4902. The shortest path between them based on Euclidean distance is a straight line 4903. The gradient to the distance function measured from q is orthogonal to the iso-contours of the distance function which form perfect circles (e.g., circle 4905). Specifically, the gradient at p 4910 is pointing directly away from q. The same holds the other way: the iso-contours to the Euclidean distance relative to p are circles (e.g., circle 4906) and the gradient at p 4911 is a unit vector pointing away from q. FIG. 49B illustrates the case where a non-Euclidean distance metric is used. The shortest path between the two points is no longer a straight line 4953 and the iso-contours 4955, 4956 to the two distance functions corresponding to the two points depend on the geometry of the evolution surface. The gradient at p corresponding to the distance relative to q 4960 is tangential to the shortest geodesic path at p 4957. Likewise, the gradient at q corresponding to the distance relative to p 4961 is tangential to the shortest geodesic path at q 4958. If p and q are vertices, the former gradient is directly available in the vertex-to-vertex distance table entry for q and vice versa. If p or q are located in the interior of mesh edges or faces, the gradient is interpolated as explained above.

FIG. 45A also shows a mesh 4500 with a point 4501 positioned on a face. Iso-contour lines 4505, 4510, 4515 corresponding to three different distance values are indicated. FIG. 45B. shows the back side 4520 of the same mesh. The iso-contour shown as 4510 on FIG. 45A continues can be seen as the curve segments 4530 and 4531. The iso-contour corresponding to 4515 in FIG. 45A is shown as the curve 4535. Note that there is an abrupt change in the direction of the gradient along a curve where the distance function has a first-order discontinuity 4540. For the curve evolution to work as desired, the scale function $\delta$ is set so that the attraction and repulsion radii at any point are scaled to avoid such sudden changes in the gradient field. The maximum radius marks the distance beyond which curve sample points exert 0 attraction-repulsion forces on each other, so numerical instability due to ridges in the distance function can be avoided by making the radius smaller. In a preferred embodiment, the distance field for each vertex p is first calculated and then analyzed for abrupt changes. If any problematic areas are found, the scale function $\delta(p)$ is set so that the neighborhood within the maximum attraction-repulsion radius does not include gradient discontinuities.

Just as interpolation from vertex-to-vertex distance tables can be used to estimate distances between two points on a mesh, curve-to-vertex distance tables can be used to look up distances between vertices and piecewise linear curves with all line segments on the mesh. In the curve evolution, this is useful for computing the attraction-repulsion forces that static border curves exert on sample points along the evolving labyrinth curves. For curve-to-vertex distance tables, each line segment along a curve has a maximum distance threshold just like each vertex in a vertex-to-vertex distance table has a maximum distance threshold. An entry is added to the curve-to-vertex distance table for each vertex in a local neighborhood of a curve that lies within the distance threshold of at least one line segment. This entry contains the surface distance from the curve to the vertex and optionally one or more points and/or direction vectors determined by the application. In some cases, it is useful to know the closest points on the curve and the gradient direction (i.e., the normalized tangent vector to the shortest discrete geodesic path) at the vertex corresponding to each of these. In other cases, such as for computing attraction-repulsion forces, it is more useful to know the direction of the attraction-repulsion force that the curve exerts on a point at the vertex. Given the curve-to-vertex table, surface distances, surface distance gradients, and attraction-repulsion directions can be interpolated similar to how point-to-point surface distances and gradients are interpolated from a vertex-to-vertex distance table.

Estimating the distance between points and curves on a mesh can also be used as part of collision detection between moving and static curves on a mesh. If two adjacent samples along a dynamically evolving curve lie on opposite sides of the static curve, which can be estimated quickly using the surface distance calculation, the curves may intersect and a more precise intersection check can be performed.

Figure 50:
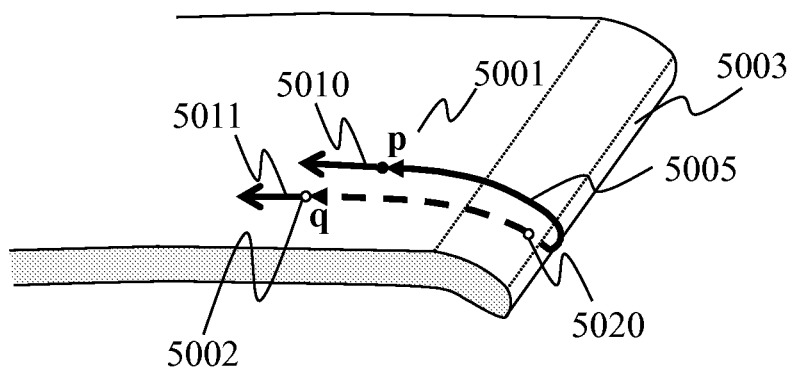
FIG. 50 shows the same curve surface depicted in FIGS. 37C-D here illustrating the shortest geodesic path between two points.

The techniques described so far allow efficient estimation of distances and distance gradients between points and curves on a mesh. This information does not in itself provide the shortest path between the points (where "shortest" depends on the distance metric used), but it can easily be used to estimate shortest paths. FIG. 50, which shows the same curve surface depicted in FIGS. 37C-D, shows a point p 5001 on the upper side of the plate and a point q 5002 on the other side. The shortest geodesic path 5005 between the points, the length of which defines the surface distance, passes from p on the top side of the object, around the edge 5003, and continues on the underside until it reaches q. Since the techniques presented earlier allow the estimation of the gradient at either point with respect to the distance function relative to the other, the direction of the tangent vector to the shortest geodesic path is known at both points. Knowing the starting point, the tangent vector at the starting point, and the length of the path, simple Euler integration can be used to calculate approximations to the shortest geodesic from both directions. The integration emanates at each of the two end points, progressing along the direction of the gradient vector field until the shortest possible curve connecting the two segments is found. Although the resulting curves may be somewhat inaccurate, they are sufficiently accurate to provide a fast way to estimate the path between the points.

An important application of this technique is in the resampling step used as part of the curve evolution in various embodiments described above. If it is determined that $|pq|_{surface}$ exceeds a predetermined threshold, where p and q are adjacent sample points along a labyrinth curve, a new point is inserted between p and q. By calculating the approximation to the shortest geodesic path as described above, it is possible to position the new point near the midpoint 5020 of the shortest geodesic curve between p and q, which is a preferred solution. It is noted that the Euler integration will introduce large errors if the gradient to the distance function has abrupt changes between p and q. As described above, one solution to this is to set the scale function $\delta$ sufficiently low that the neighborhood around each point does not include gradient discontinuities.

The invention claimed is:

1. A computer-implemented method for generating curves resembling labyrinths and maze-like patterns, the method comprising:
 a) initializing by a computer curve evolution parameters and a curve network, wherein the curve network comprises a curve embedded in a two-dimensional non-Euclidean evolution space, wherein the curve comprises a linearly ordered set of sample points in the evolution space, and wherein the curve evolution parameters comprise real-valued functions defined on the evolution space;
 b) evolving by the computer the curve using an iterative process, wherein the curve evolves in accordance with the curve evolution parameters during the iterative process to produce an evolved curve having an increased geometric complexity; and
 c) rendering by the computer the evolved curve and displaying on a display the evolved curve;
 wherein each iteration of the iterative process comprises:
 i) resampling the curve to increase the uniformity of spacing between adjacent point samples of the curve; and
 ii) spatially modulating the sample points of the curve by the curve evolution parameters, wherein the spatial modulation comprises computing, for each of the sample points, a displacement calculated in part by evaluating at each of the sample points a function defined on the evolution space;

wherein computing the displacement comprises calculating distances between each of the sample points and neighboring points using a surface distance metric that estimates a geodesic distance metric in the two-dimensional non-Euclidean evolution space.

2. The method of claim 1 further comprising precomputing the distances between each of the sample points and the neighboring points using the surface distance metric, and storing the precomputed distances in a lookup table.

3. The method of claim 2 wherein calculating the distances using the surface distance metric comprises looking up the precomputed distances stored in the lookup table.

4. The method of claim 2 further comprising calculating gradient vectors to the distances using the surface distance metric by looking up precomputed gradient values stored in the lookup table.

5. The method of claim 1 wherein computing the displacement comprises calculating distances between line segments of the curve and neighboring points using the surface distance metric.

6. The method of claim 5 further comprising precomputing the distances between line segments of the curve and neighboring points using the surface distance metric, and storing the precomputed distances in a lookup table.

7. The method of claim 6 wherein calculating the distances between line segments of the curve and neighboring points using the surface distance metric comprises looking up the precomputed distances stored in the lookup table.

8. The method of claim 6 further comprising calculating a geodesic curve between two points using the surface distance metric by looking up the precomputed distances and looking up precomputed gradient values at the two points, and progressing along the precomputed gradient vector field from both directions.

* * * * *